US012563518B2

(12) United States Patent　　　　　　(10) Patent No.:　US 12,563,518 B2
　　Salkintzis　　　　　　　　　　　　　(45) Date of Patent:　　Feb. 24, 2026

(54) CONTROL-PLANE AND USER-PLANE TRUSTED NON-3GPP GATEWAY FUNCTION

(71) Applicant: Lenovo (Singapore) Pte. Ltd., New Tech Park (SG)

(72) Inventor: Apostolis Salkintzis, Athens (GR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 287 days.

(21) Appl. No.: 18/024,479

(22) PCT Filed: Sep. 2, 2020

(86) PCT No.: PCT/EP2020/074488
§ 371 (c)(1),
(2) Date: Mar. 2, 2023

(87) PCT Pub. No.: WO2022/048743
PCT Pub. Date: Mar. 10, 2022

(65) Prior Publication Data
US 2024/0031969 A1　　Jan. 25, 2024

(51) Int. Cl.
H04W 60/00　　　(2009.01)
H04W 12/033　　　(2021.01)
(Continued)

(52) U.S. Cl.
CPC ......... H04W 60/00 (2013.01); H04W 12/033 (2021.01); H04W 12/041 (2021.01); H04W 76/12 (2018.02)

(58) Field of Classification Search
CPC . H04W 60/00; H04W 12/033; H04W 12/041; H04W 76/12; H04W 84/12;
(Continued)

(56) References Cited

U.S. PATENT DOCUMENTS 11,889,298　B2 *　1/2024　Foti ..................... H04L 61/4511
2019/0268389　A1 *　8/2019　Govindarajan ...... H04N 21/632
(Continued)

FOREIGN PATENT DOCUMENTS

WO　　　2019097499　A1　　5/2019

OTHER PUBLICATIONS

PCT/EP2020/074488, "International Search Report and the Written Opinion of the International Searching Authority, or the Declaration", International Searching Authority, Jun. 25, 2021, pp. 1-19.
(Continued)

*Primary Examiner* — Santiago Garcia
(74) *Attorney, Agent, or Firm* — Kunzler Needham & Hilton

(57)　　　　　　ABSTRACT

Apparatuses, methods, and systems are disclosed for a split TNGF. One apparatus includes a processor that receives a request from the AMF. Here, the request is sent during registration of the remote unit with the mobile communication network via the apparatus, where the request contains a first security key. The processor selects a TNGF-SG and sends a first message to the selected TNGF-SG that contains the first security key, an identity of the remote unit and a destination address and port indicating where the remote unit is to send signaling messages for the mobile communication network. The processor receives a second message from the selected TNGF-SG and establishes a first connection with the remote unit via the selected TNGF-SG. The processor completes the registration of the remote unit with the mobile communication network.

20 Claims, 13 Drawing Sheets

(51) Int. Cl.
    *H04W 12/041*    (2021.01)
    *H04W 76/12*    (2018.01)

(58) Field of Classification Search
    CPC ..... H04W 76/11; H04W 88/14; H04W 88/16;
            H04W 92/24; H04W 12/0431; H04W
            12/08; H04W 48/18; H04L 65/1016;
            H04L 65/1033; H04L 65/1069; H04L
                     65/1073; H04L 65/80
    See application file for complete search history.

(56) References Cited

U.S. PATENT DOCUMENTS

| | | | | |
|---|---|---|---|---|
| 2020/0053818 | A1* | 2/2020 | Sillanpaa | H04W 60/02 |
| 2020/0145818 | A1* | 5/2020 | Lee | H04W 60/00 |
| 2020/0383150 | A1* | 12/2020 | Ma | H04W 8/24 |
| 2021/0105693 | A1* | 4/2021 | Tripathi | H04W 84/06 |
| 2021/0297400 | A1* | 9/2021 | Lehtovirta | H04W 12/06 |
| 2021/0329452 | A1* | 10/2021 | Ito | H04W 60/00 |
| 2022/0150694 | A1* | 5/2022 | Lehtovirta | H04W 76/10 |
| 2022/0159527 | A1* | 5/2022 | Lee | H04W 4/50 |
| 2022/0174483 | A1* | 6/2022 | Tiwari | H04W 12/06 |
| 2022/0263826 | A1* | 8/2022 | Ping | H04L 41/5009 |
| 2023/0080836 | A1* | 3/2023 | Vahidi Mazinani | H04W 60/06 455/435.1 |
| 2023/0094211 | A1* | 3/2023 | Kim | H04W 36/00698 370/331 |
| 2023/0105597 | A1* | 4/2023 | Baskaran | H04L 9/0866 726/4 |
| 2023/0262460 | A1* | 8/2023 | Kunz | H04W 60/00 455/410 |

OTHER PUBLICATIONS

3GPP, "3rd Generation Partnership Project; Technical Specification Group Services and System Aspects; Study on the Wireless and Wireline Convergence for the 5G system architecture (Release 16)", 3GPP TR 23.716 V16.0.0, Dec. 2018, pp. 1-184.

3GPP, "3rd Generation Partnership Project; Technical Specification Group Services and System Aspects; System architecture for the 5G System (5GS); Stage 2 (Release 16)", 3GPP TS 23.501 V16.5.0, Jul. 2020, pp. 1-441.

3GPP, "3rd Generation Partnership Project; Technical Specification Group Services and System Aspects; Procedures for the 5G System (5GS); Stage 2 (Release 16)", 3GPP TS 23.502 V16.5.0, Jul. 2020, pp. 1-594.

3GPP, "3rd Generation Partnership Project; Technical Specification Group Core Network and Terminals; Access to the 3GPP 5G Core Network (5GCN) via Non-3GPP Access Networks (N3AN); Stage 3 (Release 16)", 3GPP TS 24.502 V16.4.0, Jun. 2020, pp. 1-87.

3GPP, "3rd Generation Partnership Project; Technical Specification Group Services and System Aspects; Security architecture and procedures for 5G system (Release 16)", 3GPP TS 33.501 V16.3.0, Jul. 2020, pp. 1-248.

3GPP, "3rd Generation Partnership Project; Technical Specification Group Radio Access Network; NG-RAN; Architecture description (Release 16)", 3GPP TS 38.401 V16.2.0, Jul. 2020, pp. 1-77.

Aboba, et al., "IEEE 802.1X For Wireless LANs", IEEE 802.11-00/035, Mar. 2000, pp. 1-27.

3GPP, "3rd Generation Partnership Project; Technical Specification Group Core Network and Terminals; Interface between the Control Plane and the User Plane Nodes; Stage 3 (Release 16)", 3GPP TS 29.244 V16.3.0, Mar. 2020, pp. 1-297.

"PFCP", Wikipedia, May 8, 2020, pp. 1-4.

B. Gupta et al., "Technical report on the interworking between 3GPP 5G system and Wlan". IEEE P802.11 Wireless LANs, Aug. 31, 2020, pp. 1-38.

\* cited by examiner

300

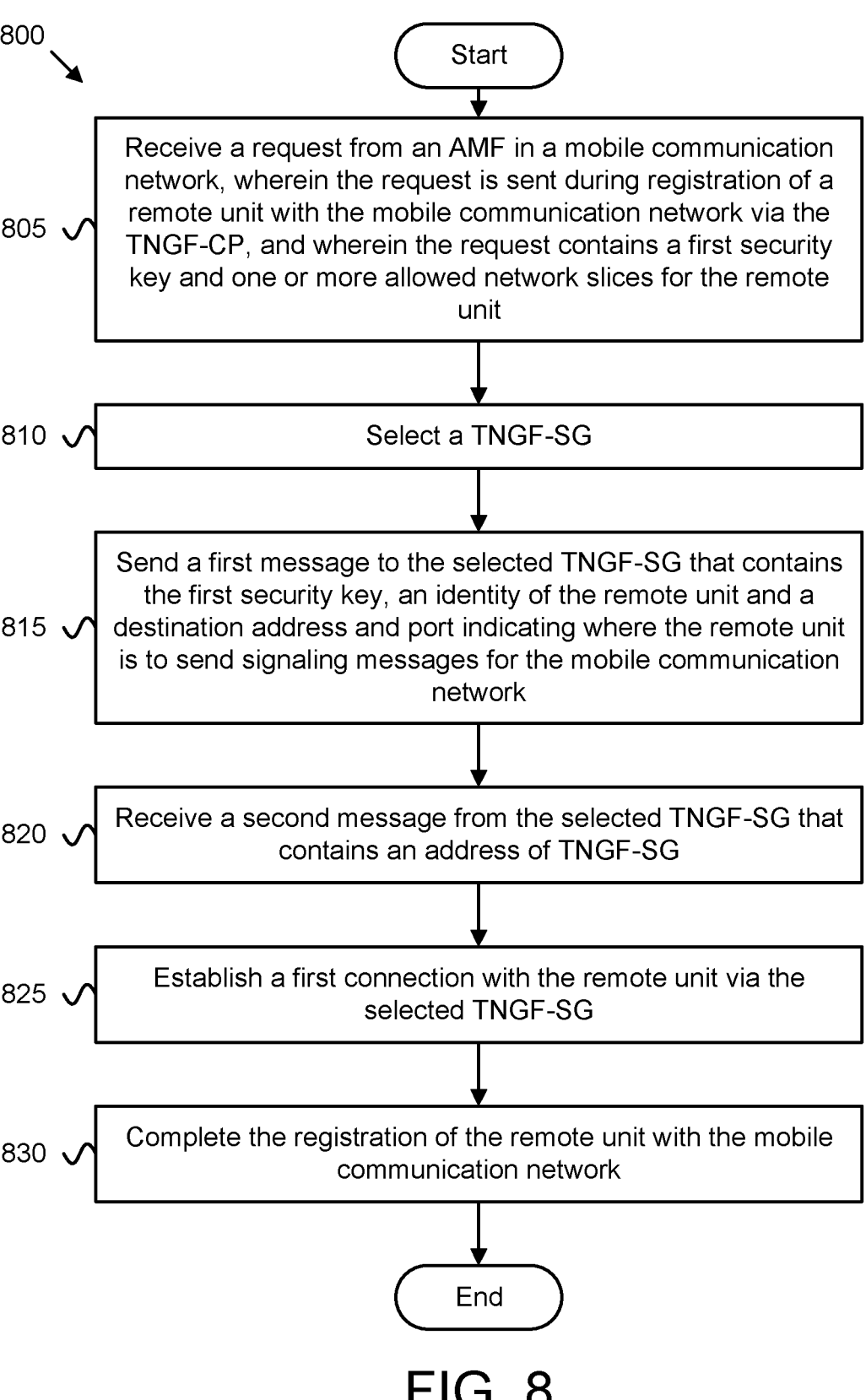

800

Start

805 — Receive a request from an AMF in a mobile communication network, wherein the request is sent during registration of a remote unit with the mobile communication network via the TNGF-CP, and wherein the request contains a first security key and one or more allowed network slices for the remote unit 810 — Select a TNGF-SG 815 — Send a first message to the selected TNGF-SG that contains the first security key, an identity of the remote unit and a destination address and port indicating where the remote unit is to send signaling messages for the mobile communication network 820 — Receive a second message from the selected TNGF-SG that contains an address of TNGF-SG 825 — Establish a first connection with the remote unit via the selected TNGF-SG 830 — Complete the registration of the remote unit with the mobile communication network End

FIG. 8

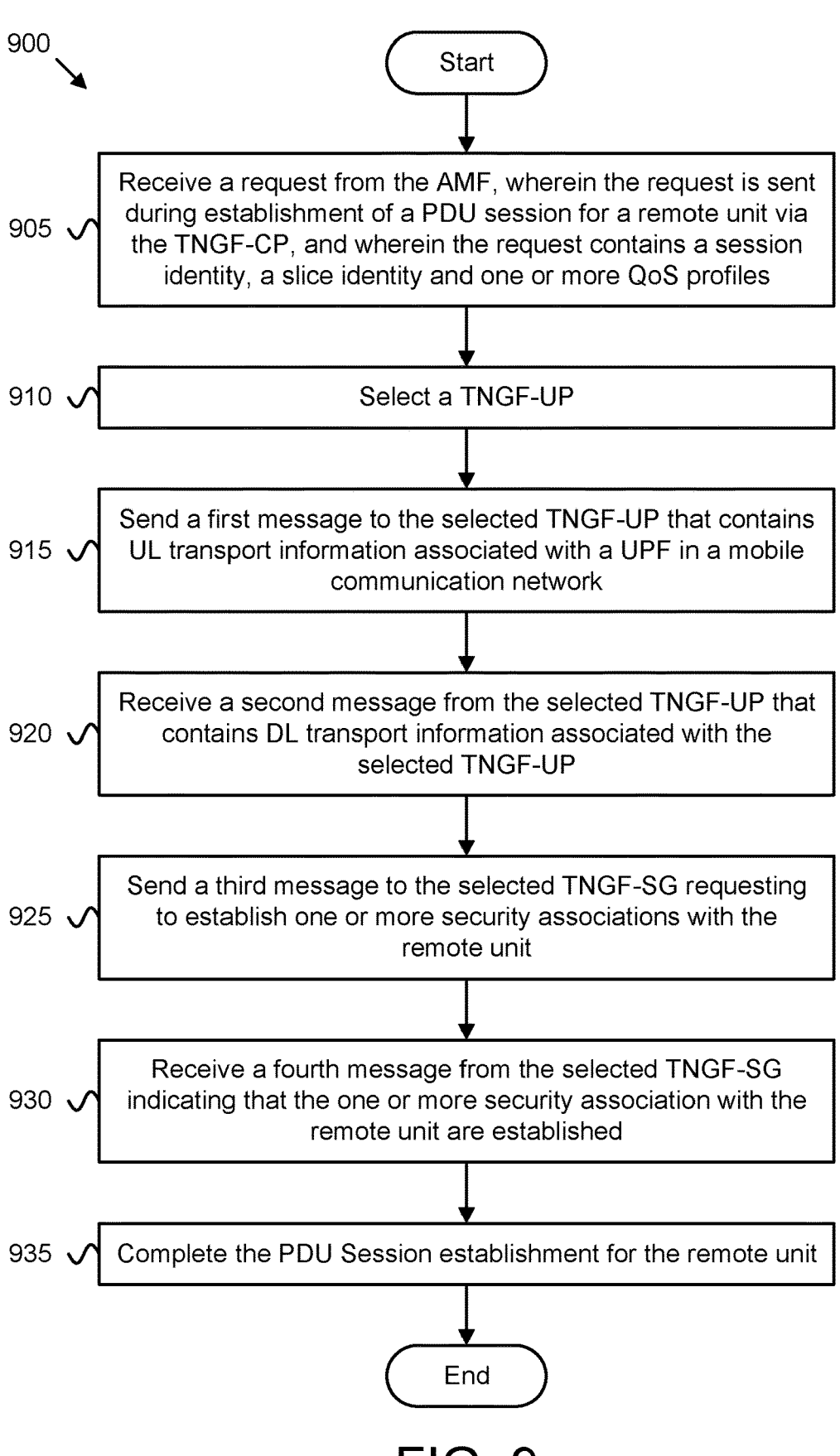

900

Start

905   Receive a request from the AMF, wherein the request is sent during establishment of a PDU session for a remote unit via the TNGF-CP, and wherein the request contains a session identity, a slice identity and one or more QoS profiles 910   Select a TNGF-UP 915   Send a first message to the selected TNGF-UP that contains UL transport information associated with a UPF in a mobile communication network 920   Receive a second message from the selected TNGF-UP that contains DL transport information associated with the selected TNGF-UP 925   Send a third message to the selected TNGF-SG requesting to establish one or more security associations with the remote unit 930   Receive a fourth message from the selected TNGF-SG indicating that the one or more security association with the remote unit are established 935   Complete the PDU Session establishment for the remote unit End

FIG. 9

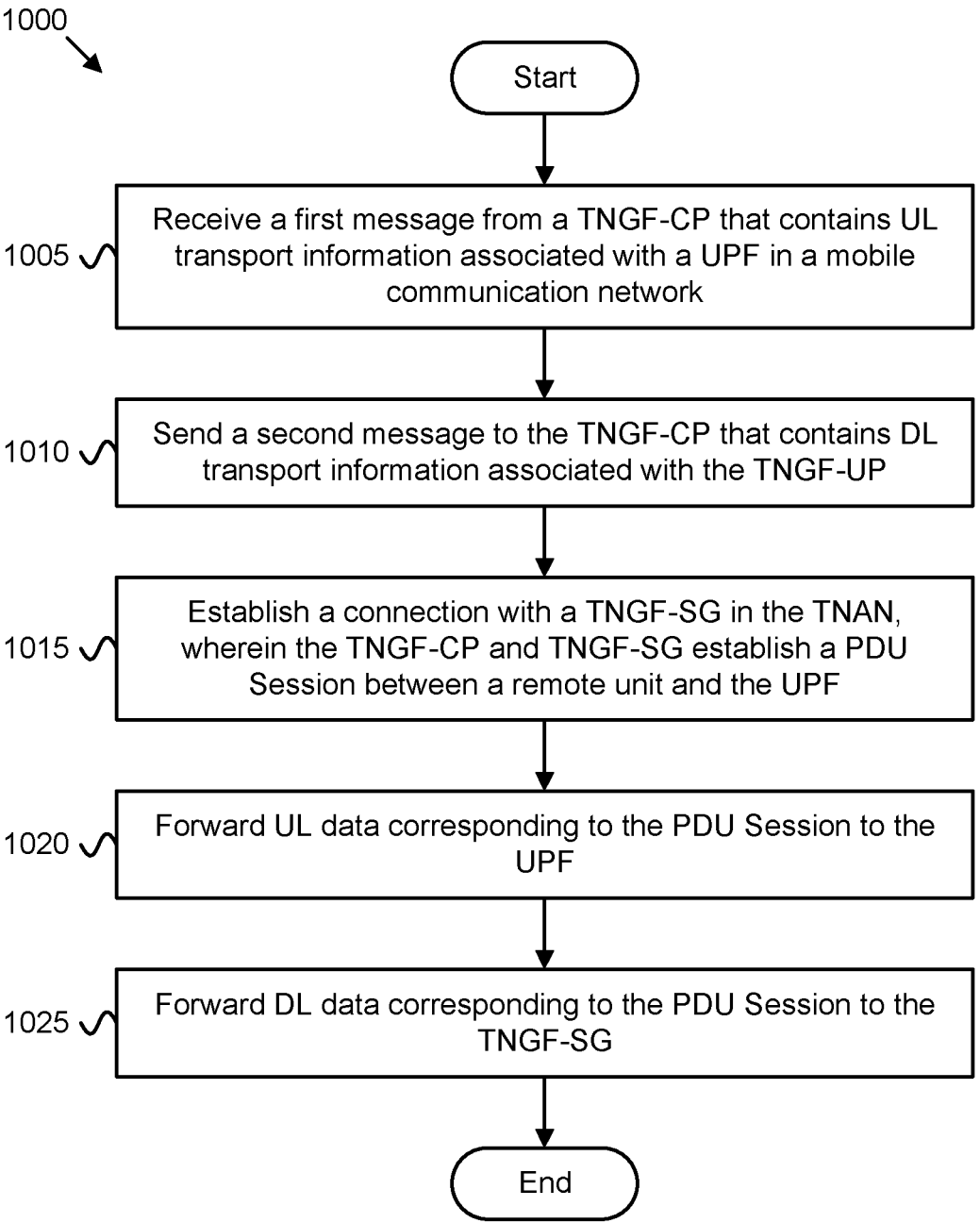

1000

Start

1005 — Receive a first message from a TNGF-CP that contains UL transport information associated with a UPF in a mobile communication network 1010 — Send a second message to the TNGF-CP that contains DL transport information associated with the TNGF-UP 1015 — Establish a connection with a TNGF-SG in the TNAN, wherein the TNGF-CP and TNGF-SG establish a PDU Session between a remote unit and the UPF 1020 — Forward UL data corresponding to the PDU Session to the UPF 1025 — Forward DL data corresponding to the PDU Session to the TNGF-SG End

FIG. 10

CONTROL-PLANE AND USER-PLANE TRUSTED NON-3GPP GATEWAY FUNCTION

The subject matter disclosed herein relates generally to distributed functionalities of a trusted non-3GPP gateway function ("TNGF").

BACKGROUND

The following abbreviations and acronyms are herewith defined, at least some of which are referred to within the following description.

Third Generation Partnership Project ("3GPP"), Fifth-Generation Core network ("5GC"), Access and Mobility Management Function ("AMF"), Access Stratum ("AS"), Application Programing Interface ("API"), Downlink ("DL"), Evolved Node-B ("eNB"), Evolved Packet Core ("EPC"), Next Generation (e.g., 5G) Node-B ("gNB"), General Packet Radio Service ("GPRS"), GPRS Tunneling Protocol ("GTP"), Home Subscriber Server ("HSS"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Mobile Network Operator ("MNO"), Mobility Management Entity ("MME"), Non-Access Stratum ("NAS"), Narrowband ("NB"), Network Function ("NF"), Network Access Identifier ("NAI"), Next Generation Application Protocol ("NGAP") Next Generation Radio Access Network ("NG-RAN"), New Radio ("NR"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Security Mode Control ("SMC"), Single Network Slice Selection Assistance Information ("S-NSSAI"), Serving Gateway ("SGW"), Session Management Function ("SMF"), Transmission Control Protocol ("TCP"), Transmit ("Tx"), Trusted Non-3GPP Access Network ("TNAN"), Trusted Non-3GPP Access Point ("TNAP"), Trusted Non-3GPP Gateway Function ("TNGF"), TNGF-Control Plane ("TNGF-CP"), TNGF-Secure Gateway ("TNGF-SG"), TNGF-User Plane ("TNGF-UP"), Unified Data Management ("UDM"), User Entity/Equipment (Mobile Terminal) ("UE"), Uplink ("UL"), User Plane ("UP"), Universal Mobile Telecommunications System ("UMTS"), User Datagram Protocol ("UDP"), Wireless Local Area Network ("WLAN"), and Worldwide Interoperability for Microwave Access ("WiMAX").

In certain embodiments, a UE may access a 5G core ("5GC") network via a gateway function in a trusted non-3GPP access network ("TNAN"). The Trusted Non-3GPP Gateway Function ("TNGF"), enables 5G devices (i.e., UEs) to connect to 5G Core ("5GC") network via trusted non-3GPP access networks, e.g., via a Wi-Fi access network deployed and managed by a 3GPP mobile operator.

BRIEF SUMMARY

Disclosed are procedures for supporting a split TNGF architecture. Such procedures may be implemented by apparatuses, systems, methods, and program products according to various embodiments.

One method of a TNGF-Control Plane ("TNGF-CP") functionality, e.g., for registering a UE, includes receiving a request from an AMF in a mobile communication network.

Here, the request is sent during registration of a remote unit (i.e., a UE) with the mobile communication network via the TNGF-CP and the request contains a first security key (e.g., TNGF key) and one or more allowed network slices (e.g., Allowed NSSAI) for the remote unit. The first method includes selecting a TNGF-SG and sending a first message to the selected TNGF-SG. Here, the first message contains the first security key, an identity of the remote unit and a destination address and port indicating where the remote unit should send signaling messages (e.g., NAS messages) for the mobile communication network. The first method includes receiving a second message from the selected TNGF-SG that contains an address of TNGF-SG and establishing a first connection (i.e., a NWt-C connection) with the remote unit via the selected TNGF-SG. The first method includes completing the registration of the remote unit with the mobile communication network.

Another method of a TNGF-CP, e.g., for establishing a PDU session, includes receiving a request from the AMF, wherein the request is sent during establishment of a PDU session for a remote unit (i.e., a UE) via the TNGF-CP, and wherein the request contains a session identity (e.g., a PDU Session ID), a slice identity (e.g., a S-NSSAI) and one or more QoS profiles. The second method includes selecting a TNGF-UP and sending a first message to the selected TNGF-UP that contains UL transport information associated with a UPF in a mobile communication network. The second method includes receiving a second message from the selected TNGF-UP that contains DL transport information associated with the selected TNGF-UP and sending a third message to the selected TNGF-SG requesting to establish one or more security associations with the remote unit. The second method includes receiving a fourth message from the selected TNGF-SG indicating that the one or more security association with the remote unit are established and completing the PDU Session establishment for the remote unit.

One method of a TNGF-User Plane ("TNGF-UP") functionality, e.g., for establishing a PDU session, includes receiving a first message from a TNGF-CP, the first message containing UL transport information associated with a UPF in a mobile communication network. The method includes sending a second message to the TNGF-CP that contains DL transport information associated with the TNGF-UP and establishing a connection with a TNGF-SG in the TNAN. Here, the TNGF-CP and TNGF-SG establish a PDU Session between a remote unit and the UPF. The method includes forwarding UL data corresponding to the PDU Session to the UPF and forwarding DL data corresponding to the PDU Session to the TNGF-SG.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a flow chart diagram illustrating one embodiment of a first method for supporting a split TNGF;

FIG. 9 is a flow chart diagram illustrating one embodiment of a second method for supporting a split TNGF; and FIG. 10 is a flow chart diagram illustrating one embodiment of a third method for supporting a split TNGF.

DETAILED DESCRIPTION

Figure 1:
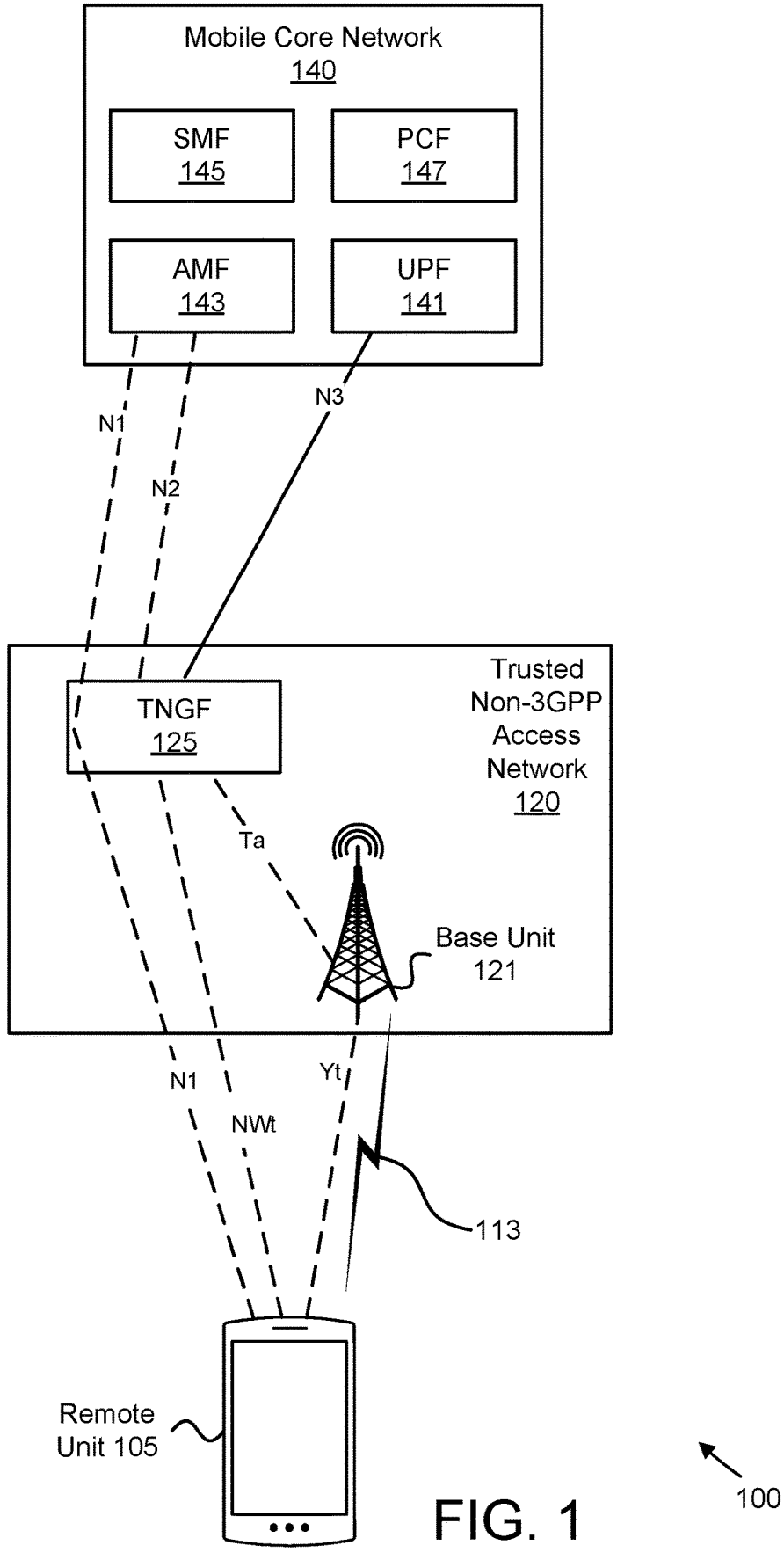
FIG. 1 is a diagram illustrating one embodiment of a wireless communication system for supporting a split TNGF.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for supporting a split TNGF. The present 3GPP specifications define a Trusted Non-3GPP Gateway Function ("TNGF"), which enables 5G devices ("UEs") to connect to 5G Core ("5GC") network via trusted non-3GPP access networks, e.g., via a Wi-Fi access network deployed and managed by a 3GPP mobile operator. In the present 3GPP specifications, the TNGF is defined as a monolithic function, i.e., as a function containing both control-plane ("CP") and user-plane ("UP") functionalities, as well as security-gateway ("SG") functionalities.

As noted above, defining the TNGF as a monolithic function that combines many different functionalities can lead to various disadvantages, which are well-known in the prior art. For example, TNAN deployments can be more costly since an entire TNGF must be deployed even when only part of the TNGF functionality is required. Also, there is no separation between control-plane and user-plane, thus, it may be difficult for the control-plane and user-plane to scale and evolve independently. Moreover, deployments may not be flexible enough because e.g., it is not possible to deploy the user-plane functionality near the UE and deploy the control-plane functionality in a centralized location.

Based on the above, the TNGF may be deployed using a "split TNGF" architecture in which the TNGF is split into smaller, separate and independent functionalities, as described in further detail below. The purpose of this disclosure is to define the separate functionalities of the TNGF and to define how the 5G registration and PDU Session establishment procedures are carried out, when the TNGF is split into separate functionalities.

In particular, this disclosure defines three separate functionalities of the TNGF: the TNGF-Control Plane (TNGF-CP) functionality; the TNGF-User Plane (TNGF-UP) functionality; and the TNGF-Secure Gateway (TNGF-SG) functionality. These functionalities of the "split" TNGF are described in greater detail below with reference to FIG. 2.

FIG. 1 depicts a wireless communication system 100 for supporting a split TNGF, according to embodiments of the disclosure. In one embodiment, the wireless communication system 100 includes at least one remote unit 105, at least one trusted non-3GPP access network ("TNAN") 120, and a mobile core network 140 in a PLMN. The TNAN 120 may be composed of at least one base unit 121. The remote unit 105 may communicate with the TNAN 120 using non-3GPP communication links 113, according to a radio access technology deployed by TNAN 120. Even though a specific number of remote units 105, base units 121, TNANs 120, and mobile core networks 140 are depicted in FIG. 1, one of skill in the art will recognize that any number of remote units 105, base units 121, TNANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as '4G') or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the TNAN 120 via uplink ("UL") and downlink ("DL") communication signals. Furthermore, the UL and DL communication signals may be carried over the communication links 113. Note, that the TNAN 120 is an intermediate network that provide the remote units 105 with access to the mobile core network 140.

The base units 121 may serve a number of remote units 105 within a serving area, for example, a cell or a cell sector, via a communication link 113. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the communication links 113. The communication links 113 may be any suitable carrier in licensed or unlicensed radio spectrum. The communication links 113 facilitate communication between one or more of the remote units 105 and/or one or more of the base units 121.

As noted above, the TNAN 120 supports secure signaling interfaces and interworking with the 5G core network. The TNAN 120 includes at least one TNGF. Moreover, the TNGF 125 may be split into separate functionalities (not depicted in FIG. 1). With a split (i.e., distributed) TNGF 125, the NWt interface existing between the remote unit 105 and TNGF 125 may be split into a control-plane component (i.e., NWt-C) and a user-plane component (i.e., NWt-U). Additionally, the Ta interface between the base unit 121 (i.e., a TNAN access point) and the TNGF 125 may also be split into control-plan and user-plane components. The signaling interfaces supported by a TNAN 120 with split-TNGF are described in detail below with reference to FIG. 2.

The base units 121 may be distributed over a geographic region. In certain embodiments, a base unit 121 may also be referred to as a Trusted Non-3GPP Access Point ("TNAP"), an access terminal, an access point, a base, a base station, a relay node, a device, or by any other terminology used in the art. The base units 121 are generally part of a radio access network ("RAN"), such as the TNAN 120, that may include one or more controllers communicably coupled to one or more corresponding base units 121. These and other elements of radio access network are not illustrated but are well known generally by those having ordinary skill in the art. The base units 121 connect to the mobile core network 140 via the TNAN 120.

In some embodiments, the remote units 105 communicate with an application server (or other communication peer) via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the TNAN 120. The PDU session represents a logical connection between the remote unit 105 and the UPF 141. In order to establish the PDU session, the remote unit 105 must be registered with the mobile core network.

In one embodiment, the mobile core network 140 is a 5G core ("5GC") or the evolved packet core ("EPC"), which may be coupled to a data network (such as the Internet and private data networks, among other data networks). A remote unit 105 may have a subscription or other account with the mobile core network 140. The present disclosure is not intended to be limited to the implementation of any particular wireless communication system architecture or protocol.

The mobile core network 140 includes several network functions ("NFs"). As depicted, the mobile core network 140 includes at least one user plane function ("UPF") 141. The mobile core network 140 also includes multiple control plane functions including, but not limited to, an Access and Mobility Management Function ("AMF") 143, a Session Management Function ("SMF") 145, and a Policy Control Function ("PCF") 147. In certain embodiments, the mobile core network 140 may also include a Unified Data Management function ("UDM") 149, an Authentication Server Function ("AUSF"), a Network Repository Function ("NRF") (used by the various NFs to discover and communicate with each other over APIs), or other NFs defined for the 5G Core.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. Each network slice includes a set of CP and/or UP network functions. A network instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed. Although specific numbers and types of network functions are depicted in FIG. 1, one of skill in the art will recognize that any number and type of network functions may be included in the mobile core network 140.

Figure 2:
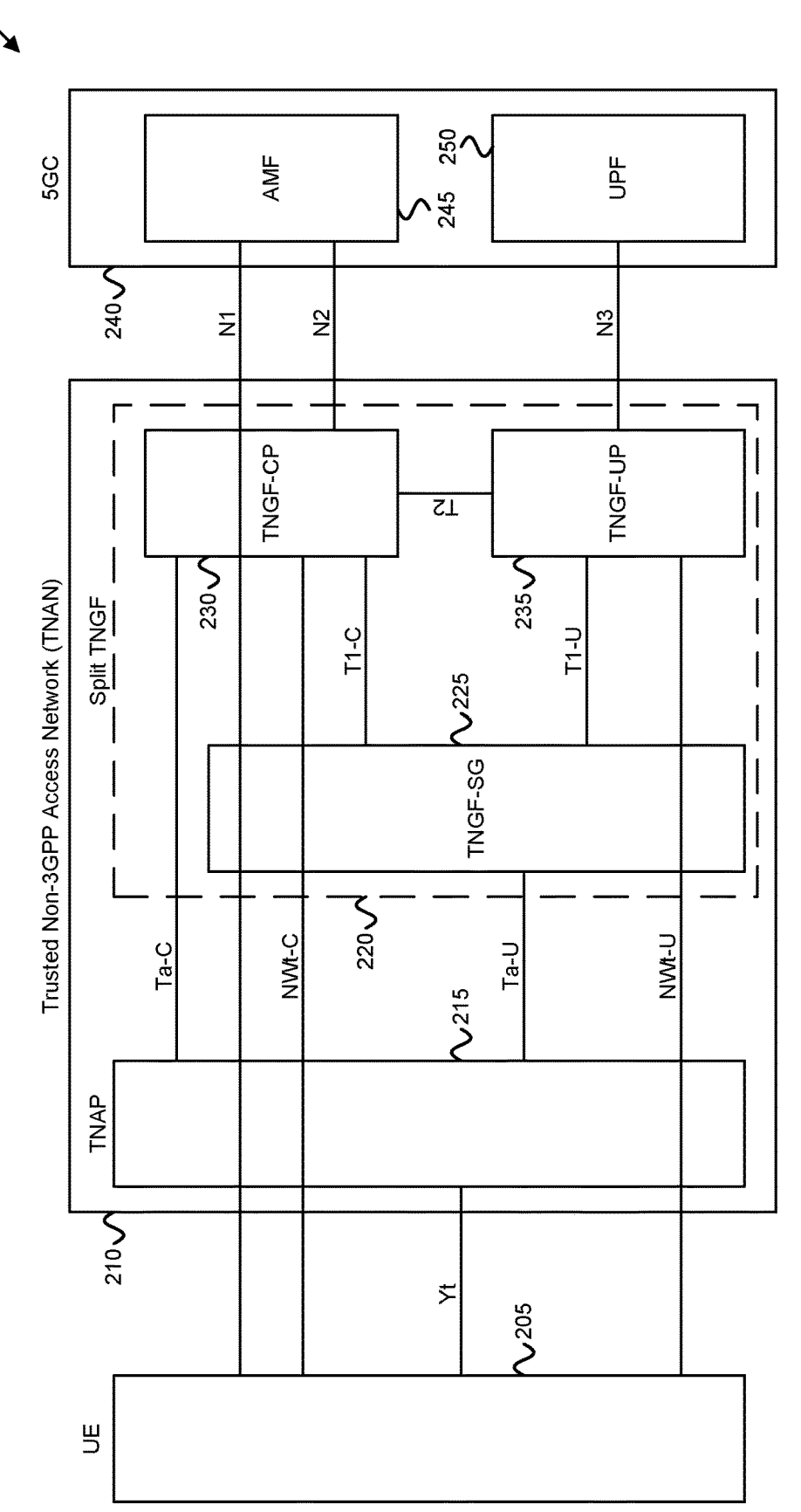
FIG. 2 is a diagram illustrating one embodiment of a TNAN architecture using split TNGF.

FIG. 2 depicts a reference architecture 200 for a split TNGF, according to embodiments of the disclosure. The architecture 200 involves a UE 205 (i.e., one embodiment of the remote unit 105), a trusted non-3GPP access network ("TNAN") 210, and a 5G core network ("5GC") 240. The TNAN 210 includes a trusted non-3GPP access point ("TNAP") 215, and a split trusted non-3GPP gateway function ("TNGF") 220. The 5GC 240 includes an AMF 245 (which interacts with the split TNGF 220 via an N2 interface) and a UPF 250 (which interacts with the split TNGF 220 via an N3 interface). As depicted, the TNGF 220 is split into three separate and independent functionalities: TNGF-SG 225, TNGF-CP 230 and the TNGF 235.

The TNGF-CP 230 is the Control Plane functionality. The role of the TNGF-CP 230 is to: (1) communicate with the UE 205 using (a) EAP-5G protocol before the NWt-C connection is established and using (b) the NWt-C connection after this connection is established; (2) communicate with the TNAP 215 via a AAA protocol or other similar protocol; (3) request from the TNGF-SG 225 to establish IPsec Security Associations (SAs) with the UE 205; and (4) requests from the TNGF-UP 235 to reserve user-plane resources for exchanging user-plane PDUs with the UE 205.

The TNGF-UP 235 is the User Plane functionality. The TNGF-UP 235 supports IP communication with the UE 205 for exchanging user-plane PDUs. The TNGF-UP 235 communicates with the TNGF-CP 230 using a new signaling protocol over the T2 interface.

The TNGF-SG 225 is the Security Gateway functionality. The TNGF-SG 225 establishes IPsec Secure Associations (SAs) with the UE 205 using the IKEv2 protocol. For each UE 205, there is one "signaling IPsec SA" and, for each PDU Session of the UE 205, there is one or more "IPsec child SA." The TNGF-SG 225 communicates with the TNGF-CP 230 using a new signaling protocol over the T1-C interface. In certain embodiments, the TNGF-SG 225 may act as a virtual private network ("VPN") gateway.

The new interfaces shown in FIG. 2 are the following:

Ta-C: Supports AAA signaling between the TNAP 215 and the TNGF-CP 230 which is used during the initial phase of the registration procedure.

Ta-U: Supports IP communication between the TNAP 215 and the TNGF-SG 225. There is no signaling protocol on this interface.

NWt-C: Supports the transport of NAS messages between the UE 205 and the TNGF-CP 230 over a dedicated TCP connection.

NWt-U: Supports IP communication between the UE 205 and the TNGF-UP 235. There is no signaling protocol on this interface.

T1-C: Supports relaying of NAS messages and also supports a new signaling protocol which enables the TNGF-CP 230 to request from the TNGF-SG 225 to establish IPsec Security Associations (SAs) with the UE 205.

T1-U: Supports IP communication between the TNGF-SG 225 and the TNGF-UP 235. There is no signaling protocol on this interface.

T2: Supports a new signaling protocol which enables the TNGF-CP 230 to request from TNGF-UP 235 to reserve user-plane resources (e.g. a UP_IP_ADDR) for exchanging user-plane PDUs with the UE 205.

Figure 3:
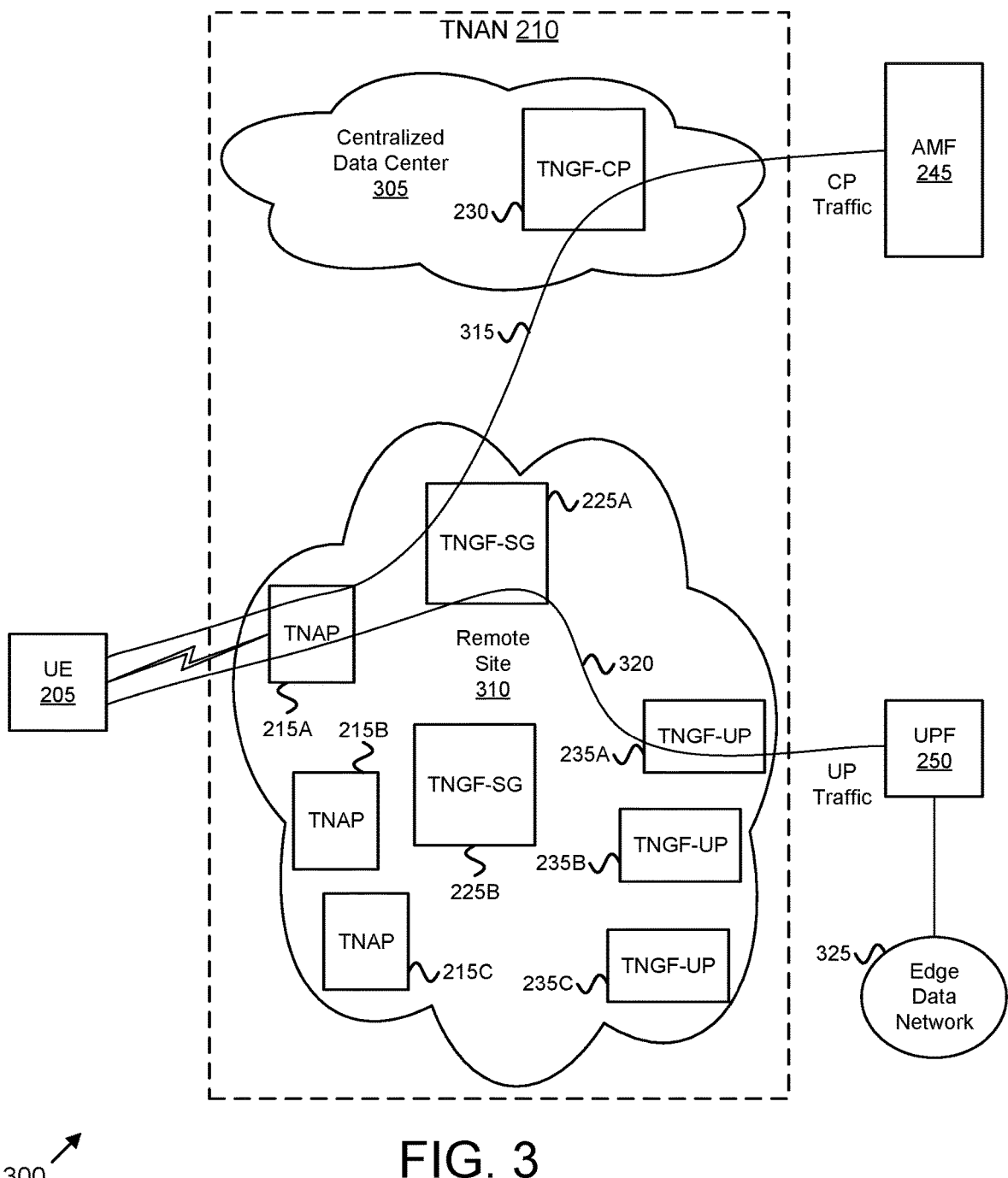
FIG. 3 is a diagram illustrating one embodiment of a deployment example with separate TNGF functionalities (e.g., a split TNGF)

FIG. 3 depicts an example deployment 300 for a 5G registration over a trusted non-3GPP access network, according to embodiments of the disclosure. The deployment 300 involves the UE 205 (e.g., one embodiment of the remote unit 105), multiple instances of the TNAP 215 (identified as "215A", "215B" and "215C"), multiple instances of the TNGF-SG 225 (identified as "225A" and "225B"), an instance of the TNGF-CP 230, and multiple instances of the TNGF-UP 235 (identified as "235A", "235B" and "235C"). As depicted, the TNAN 210 is divided into a centralized data center 305 supporting a data path 315 from the TNGF-SG 225A to the AMF 245 and a remote site 310 supporting a data path 320 from the TNGF-SG 225A to the UPF 250. In various embodiments, the remote site 325 supports access to an edge data network 325.

An example deployment scenario is shown in the figure below, where the TNGF-CP functionality is located in a centralized location 305, whereas the TNGF-UP function-alities 235 and the TNGF-SG functionalities 225 are located in a remote site 310, such as a shopping mall, stadium or other areas near the end users. Note that each TNGF-UP 235 may be associated with a different network slice (or S-NS-SAI) and, when the UE 205 requests a PDU Session with a specific S-NSSAI, a TNGF-UP 235 may be selected that supports this S-NSSAI. This is another advantage of the proposed split of the TNGF: A TNGF can support various network slices by using a different TNGF-UP instances 235 for each network slice and by using a single TNGF-CP 230 for all network slices.

FIGS. 4A-4D depict a procedure 400 for supporting a split TNGF, according to embodiments of the disclosure. The procedure 400 illustrates a first solution for 5G registration and PDU Session establishment for the case of split TNGF which involves the UE 205, the TNAN 210 (containing the TNAP 215, the TNGF-SG 225, the TNGF-CP 230, the TNGF-UP 235), and 5GC 240 (containing the AMF 245 and UPF 250).

The procedure 400 illustrates the signaling procedure that is applied when the UE 205 registers to 5G via a TNAN 210 that supports a split TNGF 220. This procedure 400 is referred to as "5G registration using a split TNGF" and is a modification to the existing "Registration procedure for trusted non-3GPP access" specified in TS 23.502, clause 4.12a.2.2, with some extensions and additions shown. Note that the split TNGF is transparent to the UE 205, i.e., the UE 205 does not know whether it is interacting with a mono-lithic TNGF or a split TNGF. The 5GC 240 is also unaffected by the split TNGF, i.e., At FIG. 4A, the procedure 400 begins at step 1, the UE 205 decides to connect to a specific 5G PLMN via an available non-3GPP access network (i.e., via the TNAN 210). The UE 205 discovers a non-3GPP access network supporting 5G connectivity (or "trusted" connectivity) to this 5G PLMN, thus, it selects this "trusted" non-3GPP access network and initiates the "registration procedure for trusted non-3GPP access" specified in TS 23.502, clause 4.12a.2.2. In the most typical case, the trusted non-3GPP access network is a WLAN access network complying with the IEEE 802.11 specification. First, the UE 205 establishes a Layer-2 (L2) connection with a TNAP 215 in the TNAN 210 (see messaging 401). In the case of an IEEE 802.11 WLAN, this L2 connection corresponds to an 802.11 Asso-ciation.

At step 2, an EAP procedure is initiated. EAP messages are encapsulated into layer-2 ("L2") packets, e.g. into IEEE 802.11/802.1x packets, between the UE 205 and the TNAN 210. At step 2a, the TNAP 215 requests an identity of the UE 205 (see messaging 403). At step 2b, the UE 205 provides a NAI to the TNAP 215 (see messaging 405). The NAI provided by the UE 205 indicates that the UE 205 requests "5G connectivity" to a specific PLMN, e.g., NAI="<any_username>@nai.5gc.mnc<MNC>.mcc<MCC>0.3gppnet-work.org".

At step 3a, this NAI triggers the TNAP 215 to select a TNGF-CP (here, the TNGF-CP 230, see block 407). At step 3b, the TNAP 215 sends an AAA request to the selected TNGF-CP (see messaging 409). Between the TNAP 215 and the TNGF-CP 230, each EAP packet is encapsulated into an AAA message, since a AAA protocol runs over the Ta-C interface.

At step 4, the TNGF-CP 230 responds with a AAA response message, which includes an EAP-Request/5G-Start packet indicating to UE 205 that an EAP-5G session starts and the UE 205 can start sending NAS messages encapsulated within EAP-5G packets (see messaging 411).

At step 5, the UE 205 sends an EAP-Response/5G-NAS packet that contains Access Network parameters (AN-Params) and a Registration Request message (or a Service Request message) (see messaging 413). The AN-Params contains a UE identity (e.g. SUCI or 5G-GUTI), the Selected PLMN identity and an Establishment cause. Optionally, a Requested NSSAI may also be contained if the UE 205 does not operate in the default NSSAI Inclusion mode D (speci-fied in TS 23.502). The Establishment cause provides the reason for requesting a signaling connection with 5GC 240. The TNAP 215 forwards the EAP-Response/5G-NAS packet to the TNGF-CP 230 within an AAA Request mes-sage.

At step 6a, the TNGF-CP 230 selects an AMF 245 in the 5GC 240 of the selected PLMN (here, the AMF 245 is selected, see block 415). For example, the based on the received AN-Params and local policy, as specified in TS 23.501, clause 6.3.5. At step 6b, the TNGF-CP 230 forwards the Registration Request (or the Service Request) received from the UE 205 to the selected AMF 245 within an N2 Initial UE Message (shown as N2 msg) (see messaging 417). This message contains N2 parameters that include the Selected PLMN ID and the Establishment cause.

At step 8, a mutual authentication and key agreement procedure takes place between the UE 205 and an AUSF in 5GC 240 (the AUSF is not shown in the figure) (see messaging 419). For example, the mutual authentication and key agreement procedure may be as specified in TS 33.501. This procedure may utilize another EAP procedure (e.g., EAP-AKA'), referred to as inner-EAP, to make it clear that it is different from the EAP-5G (the outer-EAP) initiated at step 4.

At step 9, after the successful mutual authentication and key agreement, the AMF 245 an N2 message to the TNGF-CP 230 containing a Security Mode Command (SMC) request, which includes an EAP-Success packet indicating that the inner-EAP procedure is successfully completed (see messaging 421).

At step 10, the TNGF-CP 230 forwards the SMC request and the included EAP-Success packet to TNAP 215 and the TNAP 215 forwards them to UE 205 inside an EAP-Request/5G-NAS packet (see messaging 423).

At step 11, the UE 205 responds with an SMC complete message, which is forwarded to the TNGF-CP 230 (see messaging 425).

At step 12, the SMC complete message is forwarded to the AMF 245 inside an N2 message (see messaging 427).

At step 13, the AMF 245 sends an N2 message (Initial Context Setup Request) to the TNGF-CP 230 in order to request a secure connection to be established between the UE 205 and the TNGF-CP 230. This N2 message contains the TNGF key that should be used for establishing the secure connection with the UE 205 and the Allowed NSSAI, which indicates the list of one or more S-NSSAIs allowed for this UE 205. Note that the TNGF key was derived in the UE 205 and in the AUSF in step 8 and was forwarded to AMF 245 from AUSF.

Figure 4A:
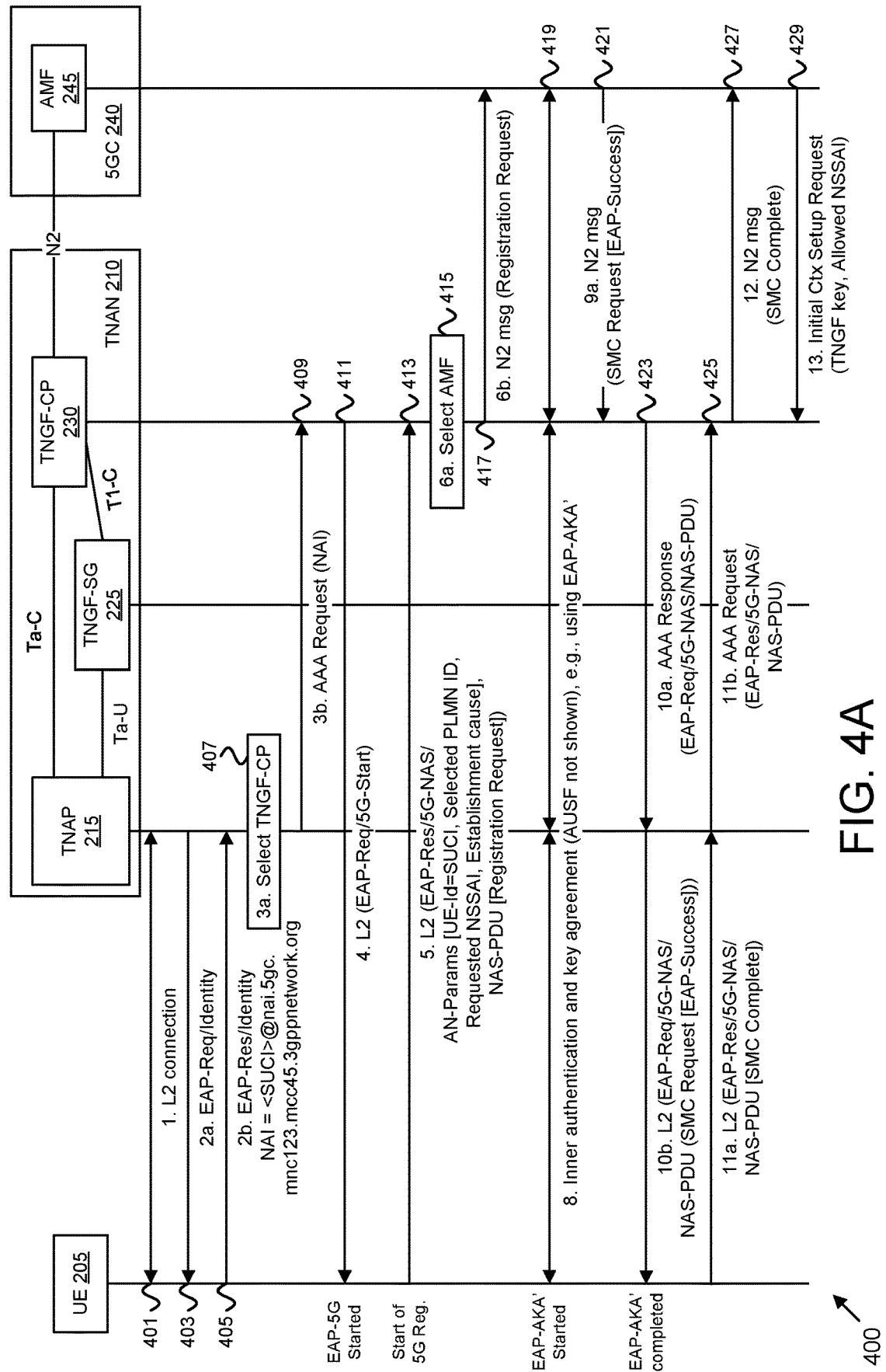
FIG. 4A is a signal flow diagram illustrating one embodiment of a first solution for TNGF reauthentication.
Figure 4B:
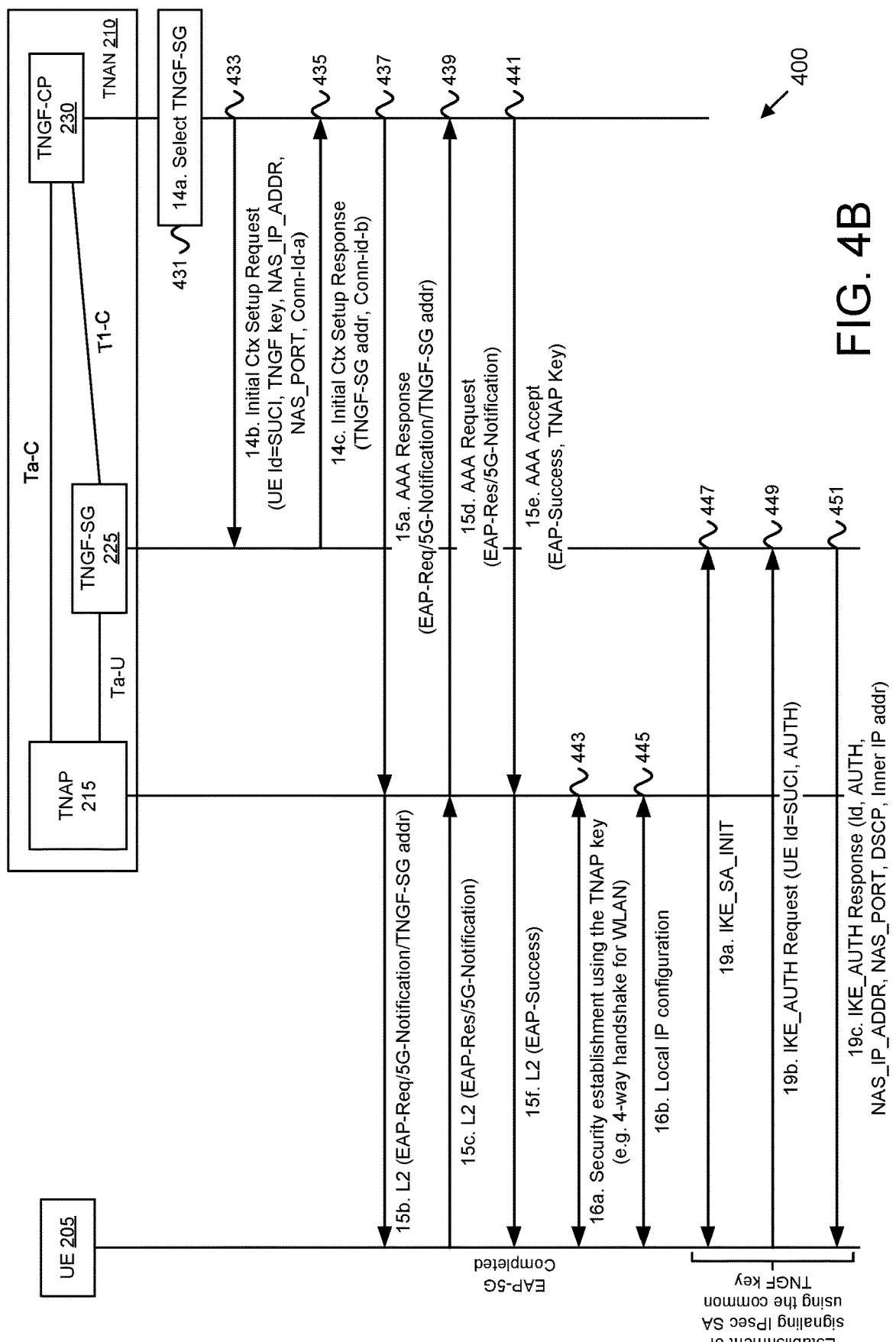
FIG. 4B is a continuation of the procedure depicted in FIG. 4A.

Continuing on FIG. 4B, at step 14a the TNGF-CP 230 selects a TNGF-SG 225, i.e., the security gateway with which the UE 205 shall establish secure communication (see block 431). This TNGF-SG 225 may be selected based on the Allowed NSSAI received from AMF 245.

Different TNGF-SGs may be deployed for different network slices (or S-NSSAIs), so the selected TNGF-SG should support all the S-NSSAIs included in the Allowed NSSAI.

At step 14b, the TNGF-CP 230 sends a T1-C message (Initial Context Setup Request) to the selected TNGF-SG 225 in order to establish a T1-C connection with the TNGF-SG associated with the UE 205, and to provide to the TNGF-SG 225 the necessary information for establishing secure communication with the UE 205 (see messaging 433). This T1-C message includes the UE identity (e.g. SUCI), the TNGF key that should be used for the secure connection establishment between the UE 205 and the TNGF-SG 225, the NAS IP Address and NAS Port of the TNGF-CP 230 towards which the UE 205 should send NAS messages and a connection identifier (i.e., "Conn-id-a").

At step 14c, after the TNGF-SG 225 stores the received information, it responds with another T1-C message (Initial Context Setup Response) that contains the TNGF-SG address towards which the UE 205 should initiate the secure connection and its own connection identifier (i.e., "Conn-id-b") (see messaging 435).

At step 15, the TNGF-CP 230 sends the TNGF-SG address to UE 205 inside an EAP-Request/5G-Notification packet (see messaging 437), and the UE 205 responds with an EAP-Response/5G-Notification packet (see messaging 439). Finally, the TNGF-CP 230 sends an EAP-Success message to UE 205 indicating that the outer EAP procedure (EAP-5G) is successfully completed (see messaging 441). During step 15, the TNGF-CP 230 also derives a TNAP key (as specified in TS 33.501) and forwards this key to the TNAP 215 (i.e., in the AAA Accept message that contains the EAP-Success message). This TNAP key is required for establishing secure communication between the UE 205 and the TNAP 215.

At step 16, the UE 205 derives the TNAP key from the TNGF key and establishes secure communication with the TNAP 215 (see messaging 443). Subsequently, the UE 205 receives IP configuration data, including a local IP address (see messaging 445).

At step 19a, the UE 205 initiates a secure connection establishment with the TNGF-SG 225, the address of which was received in step 15b (see messaging 447). This secure connection is established using the IKEv2 protocol, e.g., as specified in TS 23.502, TS 33.501 and TS 24.502.

At step 19b, after the IKE_SA_INIT exchange, the UE 205 sends an IKE_AUTH Request message including its identity (e.g. SUCI) and an AUTH payload calculated using the TNGF key in the UE 205 (see messaging 449). The TNGF-SG 225 uses the UE 205 identity to locate the UE context that was created for this UE 205 (in step 14), which contains the TNGF key that should be applied to verify the AUTH payload.

At step 19c, if the verification is successful (i.e., the TNGF-SG 225 confirms the UE 205 holds the right TNGF key), then the TNGF-SG 225 responds with an IKE_AUTH Response message containing its own AUTH payload, calculated with the TNGF key in the TNGF-SG 225, as well as an inner IP address for the UE 205 and the NAS IP Address and NAS Port of the TNGF-CP 230 towards which the UE 205 should send NAS messages (see messaging 451). After the UE 205 confirms the validity of the AUTH payload from the TNGF-SG 225, an IPsec Security Association (called "signaling IPsec SA") is established between the UE 205 and the TNGF-SG 225. The signaling IPsec SA is subsequently used to transfer NAS messages between the UE 205 and the TNGF-CP 230, via the TNGF-SG 225.

Figure 4C:
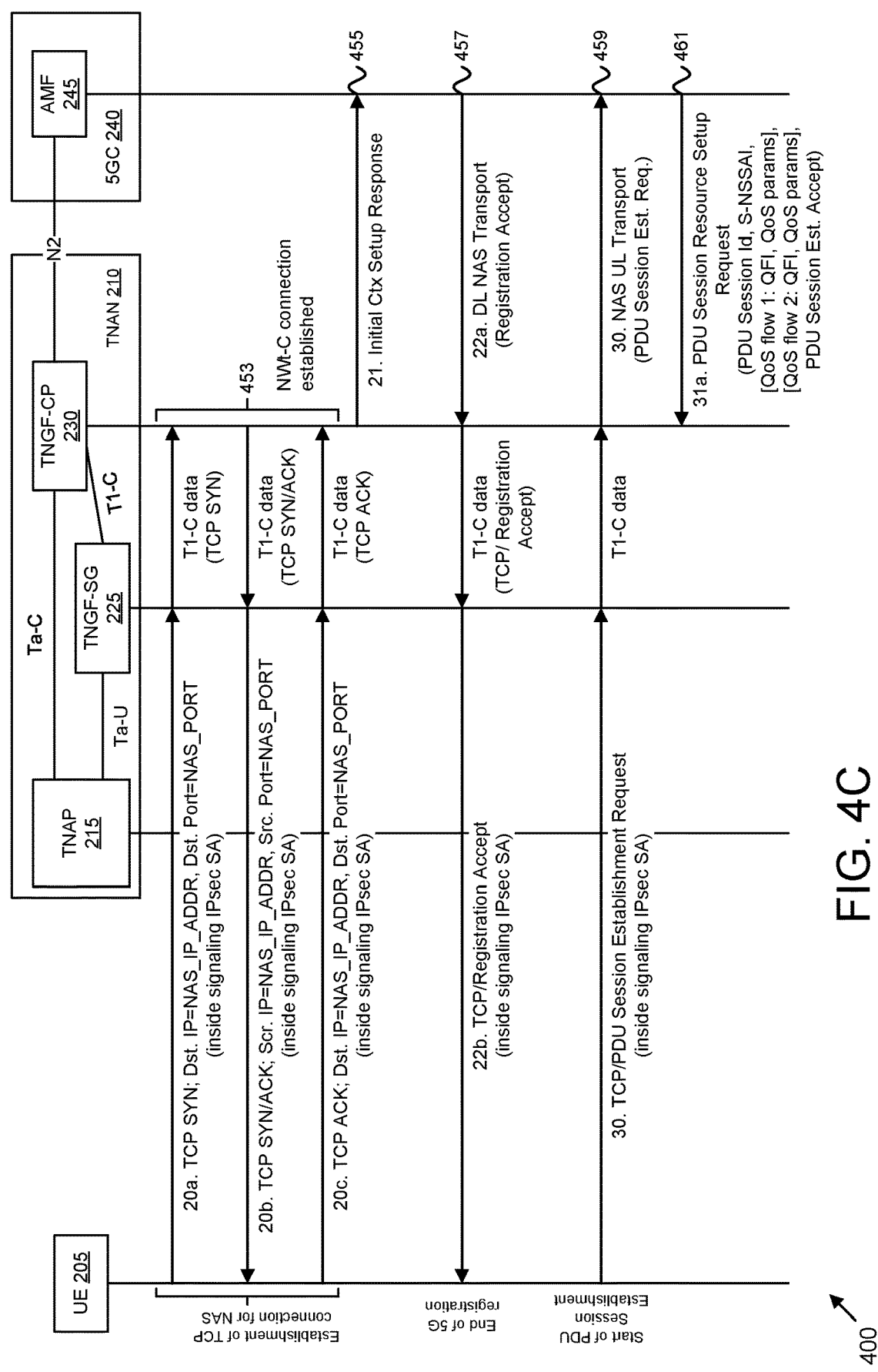
FIG. 4C is a continuation of the procedure depicted in FIGS. 4A-4B.

Continuing at FIG. 4C, at step 20 the UE 205 establishes a TCP connection towards the NAS IP Address and NAS Port of the TNGF-CP 230, via the signaling IPsec SA established in step 19 (see messaging 453). The establishment of the TCP connection between the UE 205 and the TNGF-CP 230 signals also the establishment of the NWt-C connection between the UE 205 and the TNGF-CP 230. All subsequent NAS messages between the UE 205 and the TNGF-CP 230 are exchanged via this TCP connection or, equivalently, via the NWt-C connection. Note that the TNGF-SG 225 relays all data received from UE 205 via the signaling IPsec SA to the TNGF-CP 230 via the T1-C connection that was established in step 14 for this UE 205.

At step 21, since a secure signaling connection is established between the UE 205 and the TNGF-CP 230 (the NWt-C connection), the TNGF-CP 230 responds to AMF 245 with an Initial Context Setup Response message (see messaging 455).

At step 22, the AMF 245 completes the 5G registration procedure by sending a Registration Accept message to UE 205, via the TNGF-CP 230 and the TNGF-SG 225 (see messaging 457). At this point, the UE 205 has successfully registered with 5GC and has established a secure signaling connection with the TNGF-CP 230 (the NWt-C connection) via which NAS messages can be exchanged.

At step 30, the UE 205 decides to establish a PDU Session with 5GC so that data communication with an external Data Network (DN) can be performed. For this purpose, the UE 205 sends a PDU Session Establishment Request message to the TNGF-CP 230 via the established NWt-C connection (see messaging 459). The TNGF-CP 230 forwards the PDU Session Establishment Request message to AMF 245 and the normal PDU Session procedure in 5GC is initiated.

At step 31, as part of the PDU Session establishment procedure, the AMF 245 sends a N2 message (PDU Session Resource Setup Request) to the TNGF-CP 230 in order to trigger the establishment of user-plane resources in the trusted non-3GPP access network for the requested PDU Session (see messaging 461). This message includes the PDU Session identity, the S-NNSAI, information about the QoS flows of the PDU Session, and the PDU Session Establishment Accept message.

Figure 4D:
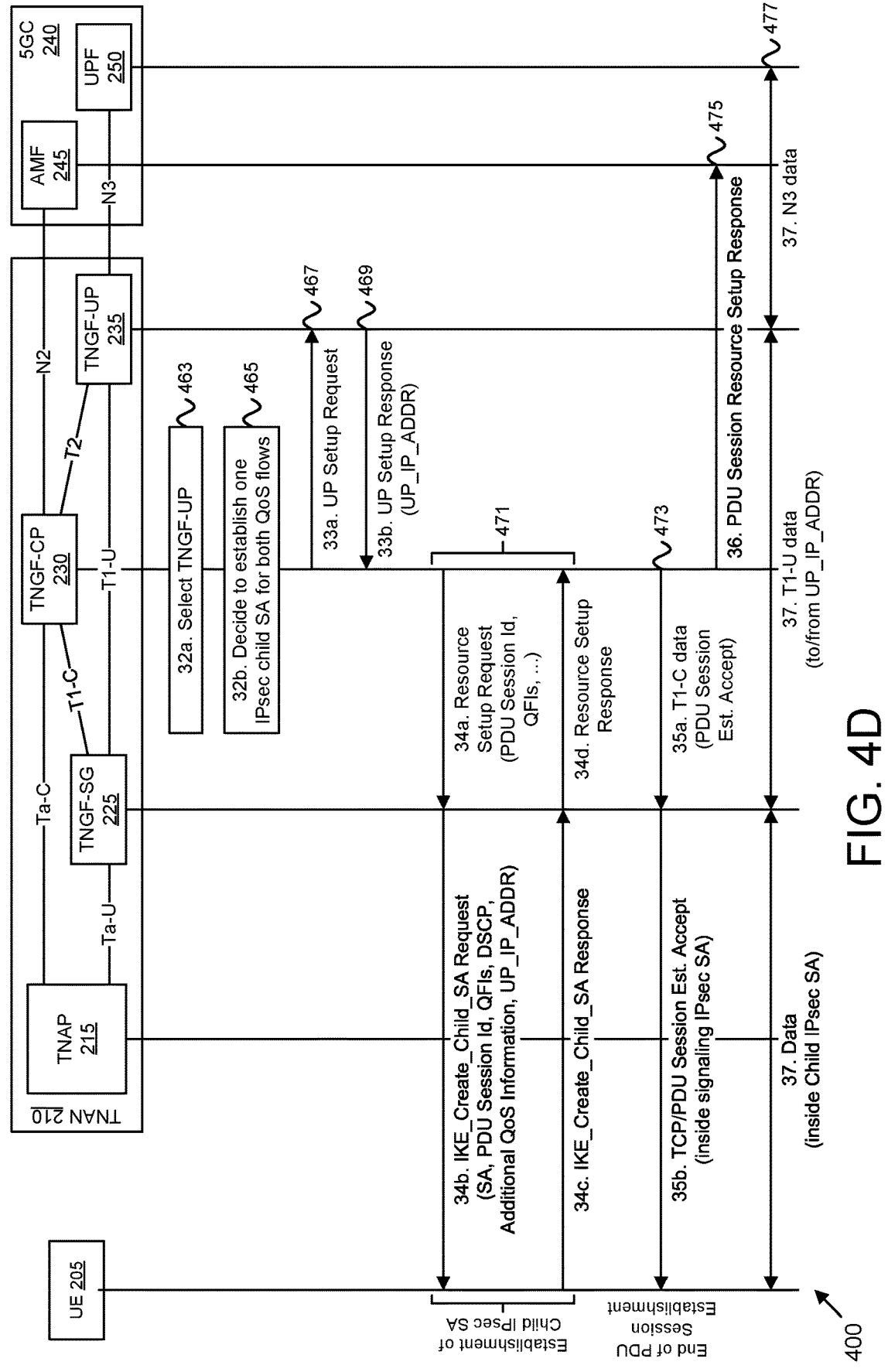
FIG. 4D is a continuation of the procedure depicted in FIG. 4A-4C.

Continuing at FIG. 4D, at step 32a the TNGF-CP 230 selects a TNGF-UP for this PDU Session, e.g., based on the received S-NSSAI (see block 463). Here, the TGNF-UP 235 is selected. It is envisioned that different TNGF-UPs will be deployed for different S-NSSAIs, so a TNGF-UP must be selected that supports the S-NSSAI for the requested PDU Session.

At step 32b, the TNGF-CP 230 determines how many IPsec child SAs to establish (see block 465). In the depicted example, the TNGF-CP 230 decides to establish one IPsec child SA between the UE 205 and the TNGF-SG 225 for this PDU Session, which will carry all QoS flows of the PDU Session. This decision is based on the TNGF-CP 230 implementation logic and, in other cases, the TNGF-CP 230 may decide to establish multiple IPsec child SAs for the PDU Session, e.g., one IPsec child SA per QoS flow.

When multiple IPsec child SAs are established between the UE 205 and the TNGF-SG 225 for the PDU Session, then two scenarios are possible: 1) A single TNGF-UP is selected, in which case all IPsec child SAs are linked with the same TNGF-UP (in this scenario there is one N3 interface for the PDU Session); and 2) Multiple TNGF-UPs are selected, each TNGF-UP linked with one or more IPsec child SAs (in this scenario there are multiple N3 interfaces for the PDU Session, one per TNGF-UP).

Although scenario 2) is not explicitly discussed in this disclosure, it is considered as a feasible alternative scenario. When the TNGF-CP 230 decides to select multiple TNGF-UPs for the PDU Session, then steps 33-34 below are repeated for each selected TNGF-UP.

At step 33a, the TNGF-CP 230 sends a request message to the selected TNGF-UP 235 via the T2 interface in order to prepare the TNGF-UP 235 for the upcoming user-plane communication (see messaging 467). This request message indicates to the TNGF-UP 235 the IP address and the GTP tunnel identifier (called "UL transport information") of the UPF 250, which are needed by TNGF-UP 235 to send uplink data to UPF 250 for the PDU Session.

At step 33b, in response, the TNGF-UP 235 sends to the TNGF-CP 230 its own IP address and GTP tunnel identifier (called "DL transport information"), which are needed by UPF 250 to send downlink data to the TNGF-UP 235 for the PDU Session (see messaging 469). The TNGF-CP 230 sends to 5GC 240 the IP address and GTP tunnel identifier of the TNGF-UP 235, in step 36. In addition, the TNGF-UP 235 sends to the TNGF-CP 230 the IP address (UP_IP_ADDR) towards which the UE 205 should send uplink data for the PDU Session.

At step 34a, the TNGF-CP 230 requests from the TNGF-SG 225 to setup an IPsec child SA for the PDU Session by sending a T1-C message (Resource Setup Request) to the TNGF-SG 225. This message contains all necessary information for setting up the IPsec child SA, including the PDU Session ID, the QoS Flow Identifiers (QFIs), the DSCP value, the Additional QoS Information, the UP_IP_ADDR allocated by TNGF-UP 235, etc. All these parameters are specified in detail in TS 23.502. Note that the TNGF-CP 230 instructs the TNGF-SG 225 to establish the number of IPsec child SAs determined in step 32.

At step 34b, the TNGF-SG 225 sets up a IPsec child SA with the UE 205, e.g., by sending an IKE_Create_Child_SA request message, and at step 34c the UE 205 sends a response message. At step 34d, after setting up the IPsec child SA with the UE 205, the TNGF-SG 225 sends with a T1-C message (Resource Setup Response) to the TNGF-CP 230 indicating that the requested resources have been set up (see messaging 471).

At step 35, the TNGF-CP 230 sends to UE 205 the PDU Session Establishment Accept message received from AMF 245 in step 31a (see messaging 473). This message is sent over the established NWt-C connection.

At step 36, the TNGF-CP 230 responds to AMF 245 with a PDU Session Resource Setup Response message indicating that the access resources for the PDU Session are established (see messaging 475). This message contains the "DL transport information" that was received by TNGF-UP 235 in step 33b. After this step, the requested PDU Session is established and the UE 205 can communicate with an external Data Network (DN) via the 5G system.

At step 37, the UE 205 sends every uplink PDU via the established IPsec child SA to the TNGF-SG 225, which forwards the PDU to the UP_IP_ADDR of the TNGF-UP 235. In turn, the TNGF-UP 235 forwards the PDU inside an N3 packet to UPF 250 (see messaging 477). Similar forwarding procedures are executed in reverse for each downlink PDU, i.e., the UPF 250 forwards a PDU inside an N3 packet to the TNGF-UP 235, which in turn sends the downlink PDU to the TNGF-SG 225 and the TNGF-SG 225 forwards the downlink PDU via the established IPsec child SA to the UE 205.

Figure 5:
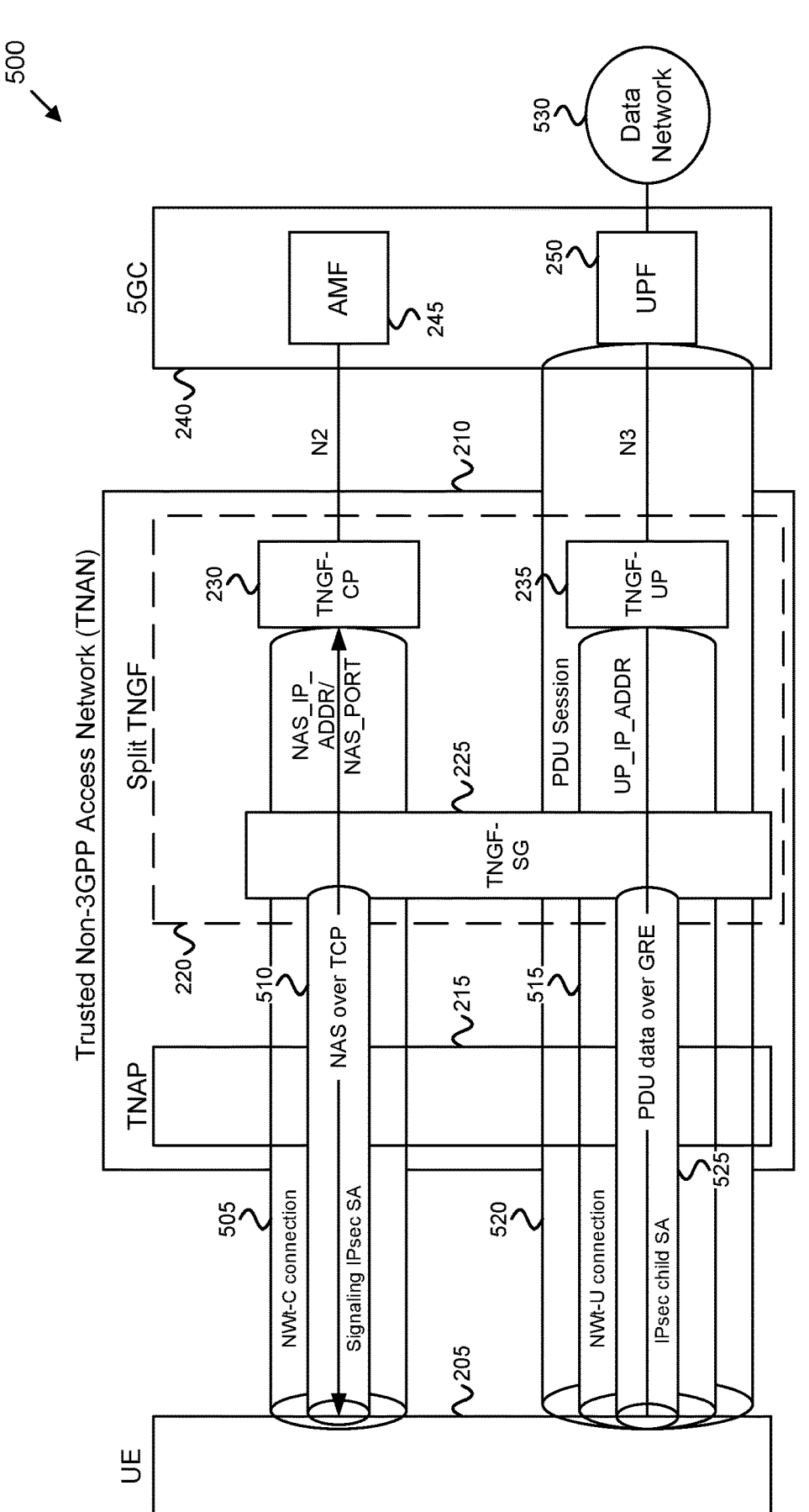
FIG. 5 is a diagram illustrating one embodiment of a split TNAN architecture with established connections and IPsec Security Associations (SAs)

FIG. 5 depicts a split TNGF architecture 500 with established connections and IPsec Security Associations (SAs), according to embodiments of the disclosure. The established connections include a NWt-C connection 505 and at least one NWt-U connection 515. As depicted, the NWt-C connection 505 includes a signaling IPsec SA 510 and supports NAS signaling over TCP with the TNGF-CP 230. Also as depicted, NWt-U connection 515 is contained within a PDU Session 520. The NWt-U connection 515 also includes a child IPsec SA 525 and supports PDU data transfer over GRE with the TNGF-UP 235. The UE 205 can communicate with an external Data Network (DN) 530 via the 5G system 240.

FIG. 5 schematically illustrates the established connections and IPsec Security Associations (SAs) after the procedure 400 (i.e., registration & PDU Session establishment) is completed. Recall the PDU session represents a logical connection between the UE 205 and the UPF 250. FIG. 5 also illustrates how the UE 205 exchanges NAS messages with the AMF 245 via the TNGF-CP 230 and the TNGF-SG 225, and how the UE 205 exchanges data PDUs with the UPF 250 via the TNGF-UP 235 and the TNGF-SG 225. The NWt-C connection 505 corresponds to a TCP connection 510 between the UE 205 and the TNGF-CP 230. However, the NWt-U connection 515 between the UE 205 and the TNGF-UP 235 does not correspond to an underlying connection. The NWt-U connection 515 supports only IP communication between the UE 205 and the TNGF-UP 235 by using specific IP addresses: The inner IP address at the UE 205 and the UP_IP_ADDR at the TNGF-UP 235. Note that there may be a different TNGF-UP 235 for each IPsec child SA 525 of the PDU session 520 and that there is one NWt-U connection 515 for each TNGF-UP 235 involved with the PDU session 520.

Figure 6:
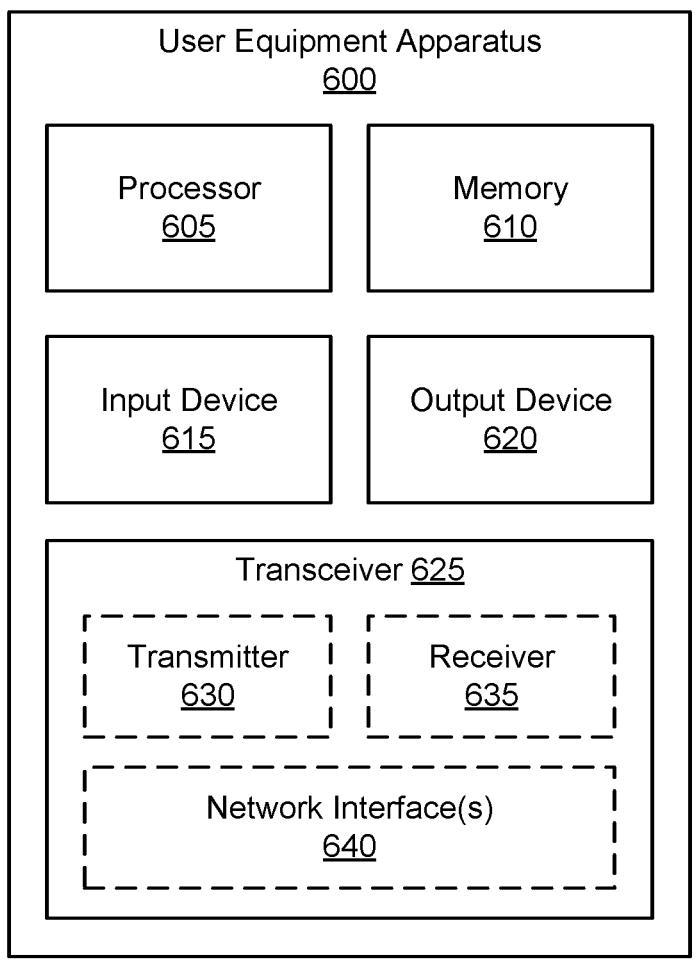
FIG. 6 is a block diagram illustrating one embodiment of a user equipment apparatus that supports a split TNGF.

FIG. 6 depicts one embodiment of a user equipment apparatus 600, according to embodiments of the disclosure. The user equipment apparatus 600 may be one embodiment of the remote unit 105 and/or the UE 205. Furthermore, the user equipment apparatus 600 may include a processor 605, a memory 610, an input device 615, an output device 620, a transceiver 625. In certain embodiments, the user equipment apparatus 600 does not include any input device 615 and/or output device 620.

As depicted, the transceiver 625 includes at least one transmitter 630 and at least one receiver 635. Here, the transceiver 625 communicates with a mobile core network (e.g., a 6GC) via an access network. Additionally, the transceiver 625 may support at least one network interface 640. Here, the at least one network interface 640 facilitates communication with an TNGF (e.g., using the "NWt" interface). Additionally, the at least one network interface 640 may include an interface used for communications with an AMF, an SMF, and/or a UPF.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625. In various embodiments, the processor 605 controls the user equipment apparatus 600 to implement the above described UE behaviors.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data relating to UE activity, for example storing identities, message parameters, IP addresses, and the like. In certain embodiments, the memory 610 also stores program code and related data, such as an operating system ("OS") or other controller algorithms operating on the user equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/ circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
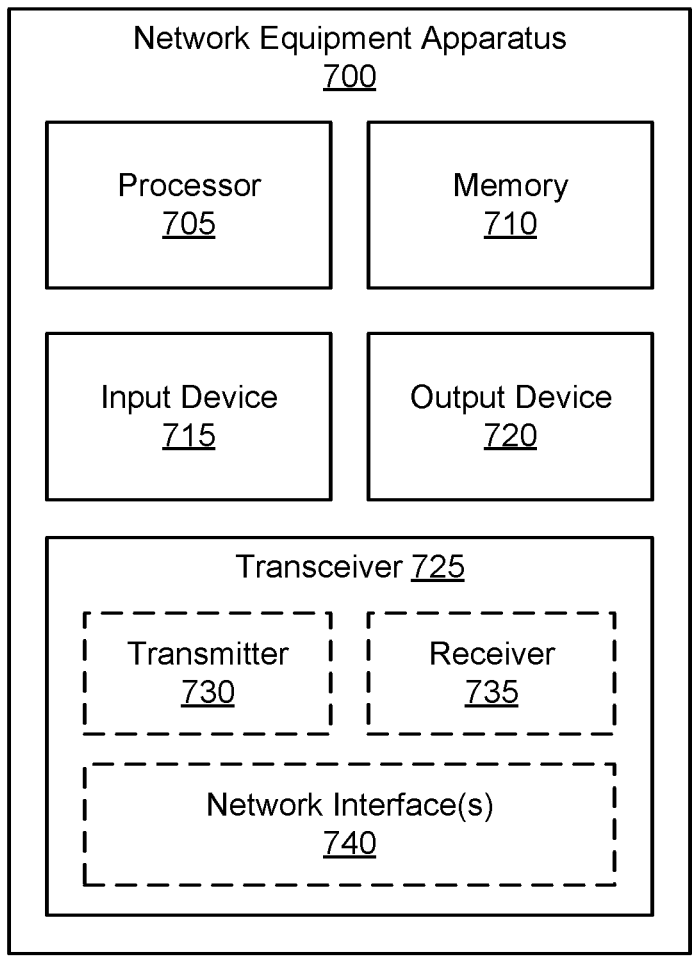
FIG. 7 is a block diagram illustrating one embodiment of a network equipment apparatus that implements a split TNGF.

FIG. 7 depicts one embodiment of a network equipment apparatus 700, according to embodiments of the disclosure. In some embodiments, the network equipment apparatus 700 may be one embodiment of a TNGF-SG, TNGF-CP, and/or TNGF-UP. Furthermore, network equipment apparatus 700 may include a processor 705, a memory 710, an input device 715, an output device 720, a transceiver 725. In some embodiments, the input device 715 and the output device 720 are combined into a single device, such as a touch screen. In certain embodiments, the network equipment apparatus 700 does not include any input device 715 and/or output device 720.

As depicted, the transceiver 725 includes at least one transmitter 730 and at least one receiver 735. Here, the transceiver 725 communicates with one or more remote units 105. Additionally, the transceiver 725 may support at least one network interface 740, such as the NWt, N2, and N3 interfaces depicted in FIG. 1. In some embodiments, the transceiver 725 supports a first interface for communicating with a RAN node, a second interface for communicating with one or more network functions in a mobile core network (e.g., a 7GC) and a third interface for communicating with a remote unit (e.g., UE).

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the first transceiver 725.

In various embodiments, the processor 705 controls the network equipment apparatus 700 to implement the above described split TNGF behaviors. For example, when implementing a control-plane portion of a split TNGF, the transceiver 725 may support a first interface (e.g., a Ta-C connection) that communicates with a UE via a TNAP and a second interface (e.g., a N2 interface) that communicates with an AMF in a mobile communication network.

The processor 705 receives a request from the AMF. Here, the request is sent during registration of the UE with the mobile communication network via the network equipment apparatus 700, where the request contains a first security key (e.g., a TNGF key) and one or more allowed network slices (e.g., Allowed NSSAI) for the UE. In some embodiments, the request from the AMF is a NGAP Initial Context Setup Request message. In some embodiments, the request is sent in response to the UE sending a Registration Request message to the mobile communication network via the network equipment apparatus 700.

The processor 705 selects a TNGF-SG. In some embodiments, the processor selects a TNGF-SG that supports the one or more allowed network slices for the UE. The processor 705 sends a first message to the selected TNGF-SG that contains the first security key, an identity of the UE and a destination address and port indicating where the UE should send signaling messages (e.g., NAS messages) for the mobile communication network.

The processor 705 receives a second message from the selected TNGF-SG that contains an address of TNGF-SG. In some embodiments, the processor 705 sends the address of TNGF-SG to the UE. In some embodiments, the first message contains a first Connection Identity (e.g., Conn-id-a) and wherein the second message contains a second Connection Identity (e.g., Conn-id-b).

The processor 705 establishes a first connection (i.e., a NWt-C connection) with the UE via the selected TNGF-SG. In some embodiments, the establishment of the first connection (i.e., the NWt-C connection) indicates that an IPsec SA has been established between the UE and the TNGF-SG, wherein the IPsec SA is established using a second security key (e.g., IPsec key) derived from the first security key (e.g., the TNGF key). In some embodiments, the processor 705 communicates with the UE using the EAP-5G protocol prior to establishing the first connection.

In some embodiments, the first connection is established towards the destination address and port (e.g., NAS_IP_ADDR, NAS_PORT) indicating where the UE is to send signaling messages for the mobile communication network. In some embodiments, the first message and the second message are used to establish a second connection (e.g., a T1-C connection) between the TNGF-CP and the TNGF-SG, where the second connection is specific to the UE and is used to exchange messages between the TNGF-CP and the TNGF-SG associated with the UE.

The processor 705 completes the registration of the UE with the mobile communication network. In such embodiments, the processor 705 completes the registration of the UE by responding to the NGAP Initial Context Setup Request by sending an NGAP Initial Context Setup Response message and forwarding a Registration Accept message received from AMF to the UE.

In some embodiments, when implementing a control-plane portion of a split TNGF, the transceiver 725 may support a first interface (i.e., supporting a NWt-C connection) that communicates with a UE via a selected TNGF-SG and a second interface (i.e., a N2 interface) that communicates with an AMF in a mobile communication network. The processor 705 receives a request from the AMF, wherein the request is sent during establishment of a PDU session for the UE via the apparatus, and wherein the request contains a session identity (e.g., a PDU Session ID), a slice identity (e.g., a S-NSSAI) and one or more QoS profiles. In some embodiments, the request from the AMF is a NGAP PDU Session Resource Setup Request message. In certain embodiments, the AMF sends the request in response to the UE sending a PDU Session Establishment Request message.

The processor 705 selects a TNGF-UP. In some embodiments, selecting the TNGF-UP comprises selecting a TNGF-UP that supports the slice identity contained in the request. In some embodiments, selecting the TNGF-UP comprises selecting multiple TNGF-UPs for the PDU Session. In some embodiments, the TNGF-SG is selected during registration of the UE with the mobile communication network.

The processor 705 sends a first message to the selected TNGF-UP. Here, the first message contains UL transport information associated with a UPF in the mobile communication network. In some embodiments, the UL transport information comprises an IP address and the GTP tunnel identifier of the UPF. The processor 705 receives a second message from the selected TNGF-UP that contains DL transport information associated with the selected TNGF-UP. In some embodiments, the DL transport information comprises an IP address (i.e., UP_IP_ADDR) and the GTP tunnel identifier of the selected TNGF-UP.

The processor 705 sends a third message to the selected TNGF-SG requesting to establish one or more security associations with the UE. In some embodiments, the processor 705 determines how many security associations to establish based on the QoS profiles included in the request from AMF. In some embodiments, the third message is sent via an established T1-C connection between the TNGF-CP and the TNGF-SG, where the T1-C connection is associated with the UE.

The processor 705 receives a fourth message from the selected TNGF-SG indicating that the one or more security association with the UE are established. In some embodiments, the third message contains a first Connection Identity received from the TNGF-UP and the fourth message contains a second Connection Identity of the TNGF-SG, wherein the first and second Connection Identities are used to establish a connection between the TNGF-UP and the TNGF-SG.

The processor 705 completes the PDU Session establishment for the UE. In certain embodiments, the request from the AMF further contains a PDU Session Establishment Accept message, where completing the PDU Session establishment comprises forwarding to the UE the PDU Session Establishment Accept message via the first interface and responding to the request from AMF by sending an NGAP PDU Session Resource Setup Response message.

When implementing a user-plane portion of a split TNGF, the processor 705 may receive a first message from a TNGF-CP, the first message containing UL transport information associated with a UPF in a mobile communication network. In some embodiments, the UL transport information comprises an IP address and the GTP tunnel identifier of the UPF. The processor 705 sends a second message to the TNGF-CP that contains DL transport information associated with the TNGF-UP. In some embodiments, the DL transport information comprises an IP address and the GTP tunnel identifier of the network equipment apparatus 700.

The processor 705 establishes a connection with a TNGF-SG in the TNAN, where the TNGF-CP and TNGF-SG establish a PDU Session between a UE and the UPF. In some embodiments, the connection with the TNGF-SG corresponds to an N3 tunnel towards the UPF. The processor 705 forwards UL data corresponding to the PDU Session to the UPF and forwards DL data corresponding to the PDU Session to the TNGF-SG. In some embodiments, forwarding UL data corresponding to the PDU Session comprises forwarding UL data packets received from the TNGF-SG to the N3 tunnel and forwarding DL data corresponding to the PDU session comprises forwarding DL data packets received from the N3 tunnel to the TNGF-SG.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data relating to supporting a split TNGF, for example storing security keys, IP addresses, UE contexts, and the like. In certain embodiments, the memory 710 also stores program code and related data, such as an operating system ("OS") or other controller algorithms operating on the network equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 may communicate with one or more remote units and/or with one or more interworking functions that provide access to one or more PLMNs. The transceiver 725 may also communicate with one or more network functions (e.g., in the mobile core network 140). The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. In certain embodiments, the one or more transmitters 730 and/or the one or more receivers 735 may share transceiver hardware and/or circuitry. For example, the one or more transmitters 730 and/or the one or more receivers 735 may share antenna(s), antenna tuner(s), amplifier(s), filter(s), oscillator(s), mixer(s), modulator/demodulator(s), power supply, and the like. In one embodiment, the transceiver 725 implements multiple logical transceivers using different communication protocols or protocol stacks, while using common physical hardware.

FIG. 8 depicts one embodiment of a method 800 for supporting a split TNGF, according to embodiments of the disclosure. In various embodiments, the method 800 is performed by a control-plane entity of a split TNGF, such as the TNGF 125, split TNGF 220, the TNGF-CP 230, and/or the network equipment apparatus 700, described above. In some embodiments, the method 800 is performed by a processor, such as a microcontroller, a microprocessor, a CPU, a GPU, an auxiliary processing unit, a FPGA, or the like.

The method 800 begins and receives 805 a request from an AMF in a mobile communication network. Here, the request is sent during registration of a remote unit with the mobile communication network via the TNGF-CP and the request contains a first security key and one or more allowed network slices for the remote unit. The method 800 includes selecting 810 a TNGF-SG. The method 800 includes sending 815 a first message to the selected TNGF-SG. Here, the first message contains the first security key, an identity of the remote unit and a destination address and port indicating where the remote unit should send signaling messages for the mobile communication network. The method 800 includes receiving 820 a second message from the selected TNGF-SG that contains an address of TNGF-SG. The method 800 includes establishing 825 a first connection with the remote unit via the selected TNGF-SG. The method 800 includes completing 830 the registration of the remote unit with the mobile communication network. The method 800 ends.

FIG. 9 depicts one embodiment of a method 900 for supporting a split TNGF, according to embodiments of the disclosure. In various embodiments, the method 900 is performed by a control-plane entity of a split TNGF, such as the TNGF 125, split TNGF 220, the TNGF-CP 230, and/or the network equipment apparatus 700, described above. In some embodiments, the method 900 is performed by a processor, such as a microcontroller, a microprocessor, a CPU, a GPU, an auxiliary processing unit, a FPGA, or the like.

The method 900 begins and receives 905 a request from the AMF, wherein the request is sent during establishment of a PDU session for a remote unit via the TNGF-CP, and wherein the request contains a session identity (e.g., a PDU Session ID), a slice identity (e.g., a S-NSSAI) and one or more QoS profiles. The method 900 includes selecting 910 a TNGF-UP. The method 900 includes sending 915 a first message to the selected TNGF-UP that contains UL transport information associated with a UPF in a mobile communication network. The method 900 includes receiving 920 a second message from the selected TNGF-UP that contains DL transport information associated with the selected TNGF-UP. The method 900 includes sending 925 a third message to the selected TNGF-SG requesting to establish one or more security associations with the remote unit. The method 900 includes receiving 930 a fourth message from the selected TNGF-SG indicating that the one or more security association with the remote unit are established. The method 900 includes completing 935 the PDU Session establishment for the remote unit. The method 900 ends.

FIG. 10 depicts one embodiment of a method 1000 for supporting a split TNGF, according to embodiments of the disclosure. In various embodiments, the method 1000 is performed by a user-plane entity of a split TNGF, such as the TNGF 125, split TNGF 220, the TNGF-UP 235, and/or the network equipment apparatus 700, described above. In some embodiments, the method 1000 is performed by a processor, such as a microcontroller, a microprocessor, a CPU, a GPU, an auxiliary processing unit, a FPGA, or the like.

The method 1000 begins and receives 1005 a first message from a TNGF-CP, the first message containing UL transport information associated with a UPF in a mobile communication network. The method 1000 includes sending a second message to the TNGF-CP that contains DL transport information associated with the TNGF-UP. The method 1000 includes establishing a connection with a TNGF-SG in the TNAN. Here, the TNGF-CP and TNGF-SG establish a PDU Session between a remote unit and the UPF. The method 1000 includes forwarding UL data corresponding to the PDU Session to the UPF. The method 1000 includes forwarding DL data corresponding to the PDU Session to the TNGF-SG. The method 1000 ends.

Disclosed herein is a first apparatus for supporting a split TNGF, according to embodiments of the disclosure. The first apparatus may be implemented by a control-plane portion of a split TNGF, such as the TNGF 125, the split TNGF 220, the TNGF-CP 230, and/or the network equipment apparatus 700. The first apparatus includes a processor, a first interface (e.g., supporting a Ta-C connection) that communicates with a remote unit via a TNAP, and a second interface (e.g., a N2 interface) that communicates with an AMF in a mobile communication network. The processor receives a request from the AMF. Here, the request is sent during registration of the remote unit with the mobile communication network via the apparatus, where the request contains a first security key (e.g., a TNGF key) and one or more allowed network slices (e.g., Allowed NSSAI) for the remote unit. The processor selects a (TNGF-SG) and sends a first message to the selected TNGF-SG that contains the first security key, an identity of the remote unit and a destination address and port indicating where the remote unit should send signaling messages (e.g., NAS messages) for the mobile communication network. The processor receives a second message from the selected TNGF-SG that contains an address of TNGF-SG and establishes a first connection (i.e., a NWt-C connection) with the remote unit via the selected TNGF-SG. The processor completes the registration of the remote unit with the mobile communication network.

In some embodiments, the request from the AMF is a NGAP Initial Context Setup Request message. In such embodiments, the processor completes the registration of the remote unit by responding to the NGAP Initial Context Setup Request by sending an NGAP Initial Context Setup Response message and forwarding a Registration Accept message received from AMF to the remote unit. In some embodiments, the request is sent in response to the remote unit sending a Registration Request message to the mobile communication network via the apparatus.

In some embodiments, selecting the TNGF-SG comprises selecting a TNGF-SG that supports the one or more allowed network slices for the remote unit. In some embodiments, the processor sends the address of TNGF-SG to the remote unit.

In some embodiments, the first message contains a first Connection Identity (e.g., Conn-id-a) and wherein the second message contains a second Connection Identity (e.g., Conn-id-b). In some embodiments, the first message and the second message are used to establish a second connection (e.g., a T1-C connection) between the TNGF-CP and the TNGF-SG, where the second connection is specific to the remote unit and is used to exchange messages between the TNGF-CP and the TNGF-SG associated with the remote unit.

In some embodiments, the establishment of the first connection (i.e., the NWt-C connection) indicates that an IPsec SA has been established between the remote unit and the TNGF-SG, wherein the IPsec SA is established using a second security key (e.g., IPsec key) derived from the first security key (e.g., the TNGF key). In some embodiments, the first connection is established towards the destination address and port (e.g., NAS_IP_ADDR, NAS_PORT) indicating where the remote unit is to send signaling messages for the mobile communication network. In some embodiments, the processor communicates with the remote unit using the EAP-5G protocol prior to establishing the first connection.

Disclosed herein is a first method for supporting a split TNGF, according to embodiments of the disclosure. The first method may be performed by control-plane portion of a split TNGF, such as the TNGF 125, the split TNGF 220, the TNGF-CP 230, and/or the network equipment apparatus 700. The first method includes receiving a request from an AMF in a mobile communication network. Here, the request is sent during registration of a remote unit with the mobile communication network via the TNGF-CP and the request contains a first security key (e.g., TNGF key) and one or more allowed network slices (e.g., Allowed NSSAI) for the remote unit. The first method includes selecting a TNGF-SG and sending a first message to the selected TNGF-SG. Here, the first message contains the first security key, an identity of the remote unit and a destination address and port indicating where the remote unit should send signaling messages (e.g., NAS messages) for the mobile communication network. The first method includes receiving a second message from the selected TNGF-SG that contains an address of TNGF-SG and establishing a first connection (i.e., a NWt-C connection) with the remote unit via the selected TNGF-SG. The first method includes completing the registration of the remote unit with the mobile communication network.

In some embodiments, the request from the AMF is a NGAP Initial Context Setup Request message. In certain embodiments, completing the registration of the remote unit comprises responding to the NGAP Initial Context Setup Request by sending an NGAP Initial Context Setup Response message and forwarding a Registration Accept message received from AMF to the remote unit. In some embodiments, the request from the AMF is sent in response to the remote unit sending a Registration Request message to the mobile communication network via the TNGF-CP.

In some embodiments, selecting the TNGF-SG comprises selecting a TNGF-SG that supports the one or more allowed network slices for the remote unit. In some embodiments, the first method includes sending the address of TNGF-SG to the remote unit.

In some embodiments, the first message contains a first Connection Identity (e.g., Conn-id-a) and wherein the second message contains a second Connection Identity (e.g., Conn-id-b). In some embodiments, the first message and the second message are used to establish a second connection (e.g., a T1-C connection) between the TNGF-CP and the TNGF-SG, wherein the second connection is specific to the remote unit and is used to exchange messages between the TNGF-CP and the TNGF-SG associated with the remote unit.

In some embodiments, the establishment of the first connection (i.e., the NWt-C connection) indicates that an IPsec SA has been established between the remote unit and the TNGF-SG, wherein the IPsec SA is established using a second security key (e.g., IPsec key) derived from the first security key (e.g., the TNGF key). In some embodiments, the first connection is established towards the destination address and port (e.g., NAS_IP_ADDR, NAS_PORT) indicating where the remote unit is to send signaling messages for the mobile communication network. In some embodiments, the TNGF-CP communicates with the remote unit using the EAP-5G protocol prior to establishing the first connection.

Disclosed herein is a second apparatus for supporting a split TNGF, according to embodiments of the disclosure. The second apparatus may be implemented by a control-plane portion of a split TNGF, such as the TNGF 125, the split TNGF 220, the TNGF-CP 230, and/or the network equipment apparatus 700. The second apparatus includes a processor, a first interface (i.e., supporting a NWt-C connection) that communicates with a remote unit via a selected TNGF-SG and a second interface (i.e., a N2 interface) that communicates with an AMF in a mobile communication network.

The processor receives a request from the AMF, wherein the request is sent during establishment of a PDU session for the remote unit via the apparatus, and wherein the request contains a session identity (e.g., a PDU Session ID), a slice identity (e.g., a S-NSSAI) and one or more QoS profiles. The processor selects a TNGF-UP and sends a first message to the selected TNGF-UP. Here, the first message contains UL transport information associated with a UPF in the mobile communication network. The processor receives a second message from the selected TNGF-UP that contains DL transport information associated with the selected TNGF-UP and sends a third to the selected TNGF-SG requesting to establish one or more security associations with the remote unit. The processor receives a fourth message from the selected TNGF-SG indicating that the one or more security association with the remote unit are established and completes the PDU Session establishment for the remote unit.

In some embodiments, the request from the AMF is a NGAP PDU Session Resource Setup Request message. In certain embodiments, the AMF sends the request in response to the remote unit sending a PDU Session Establishment Request message. In certain embodiments, the request from the AMF further contains a PDU Session Establishment Accept message, wherein completing the PDU Session establishment comprises forwarding to the remote unit the PDU Session Establishment Accept message via the first interface and responding to the request from AMF by sending an NGAP PDU Session Resource Setup Response message.

In some embodiments, selecting the TNGF-UP comprises selecting a TNGF-UP that supports the slice identity contained in the request. In some embodiments, selecting the TNGF-UP comprises selecting multiple TNGF-UPs for the PDU Session. In such embodiments, each of the multiple TNGF-UPs is linked with one or more IPsec child security associations. In some embodiments, the third message is sent via an established T1-C connection between the TNGF-CP and the TNGF-SG, where the T1-C connection is associated with the remote unit.

In some embodiments, the TNGF-SG is selected during registration of the remote unit with the mobile communication network. In some embodiments, the processor determines how many security associations to establish based on the QoS profiles included in the request from AMF.

In some embodiments, the UL transport information comprises an IP address and the GTP tunnel identifier of the UPF. In some embodiments, the DL transport information comprises an IP address (i.e., UP_IP_ADDR) and the GTP tunnel identifier of the selected TNGF-UP. In some embodiments, the third message contains a first Connection Identity received from the TNGF-UP and the fourth message contains a second Connection Identity of the TNGF-SG, wherein the first and second Connection Identities are used to establish a connection between the TNGF-UP and the TNGF-SG.

Disclosed herein is a second method for supporting a split TNGF, according to embodiments of the disclosure. The second method may be performed by control-plane portion of a split TNGF ("TNGF-CP"), such as the TNGF 125, the split TNGF 220, the TNGF-CP 230, and/or the network equipment apparatus 700. The second method includes receiving a request from the AMF, wherein the request is sent during establishment of a PDU session for a remote unit via the TNGF-CP, and wherein the request contains a session identity (e.g., a PDU Session ID), a slice identity (e.g., a S-NSSAI) and one or more QoS profiles. The second method includes selecting a TNGF-UP and sending a first message to the selected TNGF-UP that contains UL transport information associated with a UPF in a mobile communication network. The second method includes receiving a second message from the selected TNGF-UP that contains DL transport information associated with the selected TNGF-UP and sending a third message to the selected TNGF-SG requesting to establish one or more security associations with the remote unit. The second method includes receiving a fourth message from the selected TNGF-SG indicating that the one or more security association with the remote unit are established and completing the PDU Session establishment for the remote unit.

In some embodiments, the request from the AMF is a NGAP PDU Session Resource Setup Request message. In certain embodiments, the AMF sends the request in response to the remote unit sending a PDU Session Establishment Request message. In certain embodiments, the request from the AMF further contains a PDU Session Establishment Accept message, wherein completing the PDU Session establishment comprises forwarding to the remote unit the PDU Session Establishment Accept message via the first interface and responding to the request from AMF by sending an NGAP PDU Session Resource Setup Response message.

In some embodiments, selecting the TNGF-UP comprises selecting a TNGF-UP that supports the slice identity contained in the request. In some embodiments, selecting the TNGF-UP comprises selecting multiple TNGF-UPs for the PDU Session. In such embodiments, each of the multiple TNGF-UPs is linked with one or more IPsec child security associations. In some embodiments, the third message is sent via an established T1-C connection between the TNGF-CP and the TNGF-SG, where the T1-C connection is associated with the remote unit.

In some embodiments, the TNGF-SG is selected during registration of the remote unit with the mobile communication network. In some embodiments, the second method includes determining how many security associations to establish based on the QoS profiles included in the request from AMF. In some embodiments, the UL transport information comprises an IP address and the GTP tunnel identifier of the UPF.

In some embodiments, the DL transport information comprises an IP address and the GTP tunnel identifier of the selected TNGF-UP. In some embodiments, the third message contains a first Connection Identity received from the TNGF-UP and the fourth message contains a second Connection Identity of the TNGF-SG, wherein the first and second Connection Identities are used to establish a connection between the TNGF-UP and the TNGF-SG.

Disclosed herein is a third apparatus for using a split TNGF, according to embodiments of the disclosure. The third apparatus may be implemented by a user-plane portion of a split TNGF (i.e., "TNGF-UP"), such as the TNGF 125, the split TNGF 220, the TNGF-UP 235, and/or the network equipment apparatus 700. The third apparatus includes a processor and a network interface that receives a first message from a TNGF-CP, the first message containing UL transport information associated with a UPF in a mobile communication network. The processor sends a second message to the TNGF-CP that contains DL transport information associated with the TNGF-UP and establishes a connection with a TNGF-SG in the TNAN, where the TNGF-CP and TNGF-SG establish a PDU Session between a remote unit and the UPF. The processor forwards UL data corresponding to the PDU Session to the UPF and forwards DL data corresponding to the PDU Session to the TNGF-SG.

In some embodiments, the UL transport information comprises an IP address and the GTP tunnel identifier of the UPF. In some embodiments, the DL transport information comprises an IP address and the GTP tunnel identifier of the TNGF-UP. In some embodiments, the connection with the TNGF-SG corresponds to an N3 tunnel towards the UPF. In such embodiments, forwarding UL data corresponding to the PDU Session comprises forwarding UL data packets received from the TNGF-SG to the N3 tunnel and forwarding DL data corresponding to the PDU session comprises forwarding DL data packets received from the N3 tunnel to the TNGF-SG.

Disclosed herein is a third method for using a split TNGF, according to embodiments of the disclosure. The third method may be performed by user-plane portion of a split TNGF, such as the TNGF 125, the split TNGF 220, the TNGF-UP 235, and/or the network equipment apparatus 700. The third method includes receiving a first message from a TNGF-CP, the first message containing UL transport information associated with a UPF in a mobile communication network. The third method includes sending a second message to the TNGF-CP that contains DL transport information associated with the TNGF-UP and establishing a connection with a TNGF-SG in the TNAN. Here, the TNGF-CP and TNGF-SG establish a PDU Session between a remote unit and the UPF. The third method includes forwarding UL data corresponding to the PDU Session to the UPF and forwarding DL data corresponding to the PDU Session to the TNGF-SG.

In some embodiments, the UL transport information comprises an IP address and the GTP tunnel identifier of the UPF. In some embodiments, the DL transport information comprises an IP address and the GTP tunnel identifier of the TNGF-UP. In some embodiments, the connection with the TNGF-SG corresponds to an N3 tunnel towards the UPF. In such embodiments, forwarding UL data corresponding to the PDU Session comprises forwarding UL data packets received from the TNGF-SG to the N3 tunnel and forwarding DL data corresponding to the PDU session comprises forwarding DL data packets received from the N3 tunnel to the TNGF-SG.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a Trusted Non-3GPP Gateway Function Control Plane entity ("TNGF-CP"), the apparatus further comprising:

at least one memory; and at least one processor coupled with the at least one memory and configured to cause the TNGF-CP to:

communicate with a user equipment ("UE") via a Trusted Non-3GPP Access Point ("TNAP");

receive a request message from an access and mobility function ("AMF") in a mobile communication network, wherein the request message is associated with a registration procedure of the UE with the mobile communication network via the TNGF-CP, and wherein the request message comprises a first security key and one or more allowed network slices for the UE;

select a Trusted Non-3GPP Gateway Function Security Gateway ("TNGF-SG") based on the one or more allowed network slices;

transmit, to the selected TNGF-SG, a first message comprising the first security key, an identity of the UE, and a destination address and port indicating where the UE is to send signaling messages for the mobile communication network;

receive, from the selected TNGF-SG, a second message comprising an address of TNGF-SG;

establish a first connection with the UE via the selected TNGF-SG; and complete the registration procedure of the UE with the mobile communication network.

2. The apparatus of claim 1, wherein the received request comprises a Next Generation Application Protocol ("NGAP") Initial Context Setup Request message, wherein to complete the registration of the UE, the at least one processor is configured to cause the TNGF-CP to: d to the NGAP Initial Context Setup Request by sending an NGAP Initial Context Setup Response message; and forward a Registration Accept message received from the AMF to the UE.

3. The apparatus of claim 1, wherein the at least one processor is configured to cause the TNGF-CP to forward a Registration Request message to the AMF, wherein the request message is received in response to forwarding the Registration Request message to the AMF.

4. The apparatus of claim 1, wherein to select the selected TNGF-SG supports the one or more allowed network slices and wherein the at least one processor is configured to cause the TNGF-CP to transmit, to the UE, an authentication response message comprising the address of TNGF-SG.

5. The apparatus of claim 1, wherein the at least one processor is configured to cause the TNGF-CP to establish a second connection between the TNGF-CP and the TNGF-SG using the first message and the second message, wherein the second connection is specific to the UE and is used to exchange messages associated with the UE.

6. The apparatus of claim 1, wherein the establishment of the first connection indicates that an Internet Protocol Security ("IPsec") Security Association ("SA") has been established between the UE and the TNGF-SG, wherein the IPsec SA is established using a second security key derived from the first security key.

7. The apparatus of claim 1, wherein the first connection is established towards the destination address and port indicating where the UE is to send signaling messages for the mobile communication network.

8. The apparatus of claim 1, wherein the at least one processor is configured to cause the TNGF-CP to communicate with the UE using an Extensible Authentication Protocol for 5th Generation (EAP-5G) protocol prior to establishing the first connection.

9. An apparatus comprising a Trusted Non-3GPP Gateway Function "TNGF") Control Plane ("TNGF-CP") entity, the apparatus further comprising:

at least one memory; and at least one processor coupled with the at least one memory and configured to cause the TNGF-CP to:

communicate with a user equipment ("UE") via a selected Trusted Non-3GPP Gateway Function Security Gateway ("TNGF-SG");

receive a request message from an access and mobility function ("AMF") in a mobile communication network, wherein the request message is received during establishment of a Protocol Data Unit ("PDU") Session for the UE via the TNGF-CP, and wherein the request message comprises a session identity, a slice identity and one or more Quality of Service ("QoS") profiles;

select a TNGF-User Plane entity ("TNGF-UP") based on the slice identity;

transmit, to the selected TNGF-UP, a first message comprising uplink ("UL") transport information associated with a User Plane Function ("UPF") in the mobile communication network;

receive a second message from the selected TNGF-UP that contains downlink ("DL") transport information associated with the selected TNGF-UP;

send a third message to the selected TNGF-SG requesting to establish one or more security associations with the UE;

receive a fourth message from the selected TNGF-SG indicating that the one or more security association with the UE are established; and complete the PDU Session establishment for the UE.

10. The apparatus of claim 9, wherein the request message from the AMF is a Next Generation Application Protocol ("NGAP") PDU Session Resource Setup Request message, wherein the at least one processor is configured to cause the TNGF-CP to forward a PDU Session Establishment Request message to the AMF, wherein the request message is received in response to forwarding the PDU Session Establishment Request message to the AMF.

11. The apparatus of claim 10, wherein the request message comprises a PDU Session Establishment Accept message, wherein to complete the PDU Session establishment, the at least one processor is configured to cause the TNGF-CP to forward the PDU Session Establishment Accept message to the UE and to send an NGAP PDU Session Resource Setup Response message in response to the request message from the AMF.

12. The apparatus of claim 9, wherein the at least one processor is configured to cause the TNGF-CP to select the TNGF-SG during a registration of the UE with the mobile communication network, wherein to select the TNGF-UP, the at least one processor is configured to cause the TNGF-CP to select a respective TNGF-UP that supports the slice identity contained in the request.

13. The apparatus of claim 9, wherein to select the TNGF-UP, the at least one processor is configured to cause the TNGF-CP to select multiple TNGF-UPs for the PDU Session, wherein each of the multiple TNGF-UPs is linked with one or more Internet Protocol Security ("IPsec") child security associations.

14. The apparatus of claim 9, wherein the third message is sent via an established T1-C connection between the TNGF-CP and the TNGF-SG, wherein the T1-C connection is associated with the UE.

15. The apparatus of claim 9, wherein the at least one processor is configured to cause the TNGF-CP to determine how many security associations to establish based on the QoS profiles included in the request message from the AMF.

16. The apparatus of claim 9, wherein the UL transport information comprises an Internet Protocol ("IP") address of the UPF and a General packet radio service Tunneling Protocol ("GTP") tunnel identifier of the UPF, wherein the DL transport information comprises an IP address of the selected TNGF-UP and a GTP tunnel identifier of the selected TNGF-UP.

17. The apparatus of claim 9, wherein the third message contains a first Connection Identity received from the TNGF-UP and wherein the fourth message contains a second Connection Identity of the TNGF-SG, wherein the at least one processor is configured to cause the TNGF-CP to establish a connection between the TNGF-UP and the TNGF-SG using the first Connection Identity and the second Connection Identity.

18. An apparatus comprising a Trusted Non-3GPP Gateway Function User Plane entity ("TNGF-UP") in a Trusted Non-3GPP Access Network ("TNAN"), the apparatus further comprising:

at least one memory; and at least one processor coupled with the at least one memory and configured to cause the TNGF-UP entity to:

receive a first message from a Trusted Non-3GPP Gateway Function Control Plane entity ("TNGF-CP"), the first message containing uplink ("UL") transport information associated with a User Plane Function ("UPF") in a mobile communication network, wherein the UL transport information comprises an Internet Protocol ("IP") address of the UPF and a General packet radio service Tunneling Protocol ("GTP") tunnel identifier of the UPF; and send a second message to the TNGF-CP that contains downlink ("DL") transport information associated with the TNGF-UP entity, wherein the DL transport information comprises an IP address of the TNGF-UP entity and a GTP tunnel identifier of the TNGF-UP entity;

establish a connection with a TNGF-SG in the TNAN, and establish a Protocol Data Unit ("PDU") Session between a user equipment ("UE") and the UPF;

forward UL data corresponding to the PDU Session to the UPF; and forward DL data corresponding to the PDU Session to the TNGF-SG.

19. The apparatus of claim 18, wherein the connection with the TNGF-SG corresponds to an N3 tunnel towards the UPF, wherein to forward UL data corresponding to the PDU Session the at least one processor is configured to cause the TNGF-CP to forward UL data packets received from the TNGF-SG to the N3 tunnel,.

20. The apparatus of claim 18, wherein the connection with the TNGF-SG corresponds to an N3 tunnel towards the UPF, wherein to forward DL data corresponding to the PDU Session the at least one processor is configured to cause the TNGF-CP to forward DL data packets received from the N3 tunnel to the TNGF-SG.

* * * * *